US009763189B2

(12) United States Patent
Ang et al.

(10) Patent No.: US 9,763,189 B2
(45) Date of Patent: Sep. 12, 2017

(54) LOW POWER SYNCHRONIZATION IN A WIRELESS COMMUNICATION NETWORK

(71) Applicant: QUALCOMM Incorporated, San Diego, CA (US)

(72) Inventors: Peter Pui Lok Ang, San Diego, CA (US); Joseph Binamira Soriaga, San Diego, CA (US); Tingfang Ji, San Diego, CA (US); Joseph Patrick Burke, Glenview, IL (US); Stephen Jay Shellhammer, Ramona, CA (US); Krishna Kiran Mukkavilli, San Diego, CA (US); John Edward Smee, San Diego, CA (US)

( * ) Notice: Subject to any disclaimer, the term of this patent is extended or adjusted under 35 U.S.C. 154(b) by 114 days.

(21) Appl. No.: 14/793,175

(22) Filed: Jul. 7, 2015

(65) Prior Publication Data

US 2016/0150474 A1 May 26, 2016

Related U.S. Application Data

(60) Provisional application No. 62/083,111, filed on Nov. 21, 2014.

(51) Int. Cl.
*H04W 56/00* (2009.01)
*H04W 52/02* (2009.01)

(52) U.S. Cl.
CPC ... *H04W 52/0216* (2013.01); *H04W 52/0293* (2013.01); *H04W 56/001* (2013.01); *Y02B 60/50* (2013.01)

(58) Field of Classification Search
CPC .............................. H04B 10/60; G01S 7/352
(Continued)

(56) References Cited

U.S. PATENT DOCUMENTS 6,154,500 A * 11/2000 Dorenbosch ............ H04L 27/10
370/343
7,103,344 B2 9/2006 Menard
(Continued)

FOREIGN PATENT DOCUMENTS

WO WO-2006124550 A2 11/2006

OTHER PUBLICATIONS

International Search Report and Written Opinion—PCT/US2015/060474—ISA/EPO—Feb. 15, 2016.
(Continued)

*Primary Examiner* — Charles C Jiang
*Assistant Examiner* — Will Lin
(74) *Attorney, Agent, or Firm* — Qualcomm IP Dept.; James Hunt Yancey, Jr.

(57) ABSTRACT

Some aspects of the present disclosure provide for methods, apparatus, and computer software for low-power synchronization of wireless communication devices. In one example, an asynchronous code division multiple access (CDMA) channel may be utilized for uplink communication. By utilizing asynchronous CDMA on the uplink, synchronization requirements are relaxed relative to other forms of communication. Accordingly, a synchronization period after coming out of a sleep state can be short, reducing power consumption during re-synchronization. In another example, a low-power companion receiver, rather than the full-power WWAN receiver, may be utilized to acquire a sync signal while the device is in its sleep state. Once synchronism is achieved via the low-power companion receiver, the full-power radio may power up and perform communication with the network. By shifting the synchronization from the full-power radio to the low-power companion radio, power consumption during re-synchronization can be achieved.

30 Claims, 19 Drawing Sheets

(58) Field of Classification Search
USPC .......................................... 375/316, 334, 303
See application file for complete search history.

(56) References Cited

U.S. PATENT DOCUMENTS

| | | | |
|---|---|---|---|
| 8,565,712 B2 | 10/2013 | Rotzoll | |
| 8,699,464 B1* | 4/2014 | Vivanco | H04W 28/0289 |
| | | | 370/331 |
| 2006/0281486 A1* | 12/2006 | Ngai | H04W 52/0245 |
| | | | 455/552.1 |
| 2009/0259865 A1 | 10/2009 | Sheynblat et al. | |
| 2010/0214969 A1 | 8/2010 | Lamm et al. | |
| 2011/0194471 A1 | 8/2011 | Kim et al. | |
| 2011/0211570 A1* | 9/2011 | Heinrich | H04W 56/00 |
| | | | 370/350 |
| 2012/0069800 A1 | 3/2012 | Soliman et al. | |
| 2013/0250827 A1* | 9/2013 | Patwardhan | H04W 52/0212 |
| | | | 370/311 |
| 2014/0075226 A1 | 3/2014 | Heo et al. | |
| 2014/0112224 A1 | 4/2014 | Jafarian et al. | |

OTHER PUBLICATIONS

Agarwal Y., et al., "On Demand Paging Using Bluetooth Radios on 802.11 Based Networks", XP002555283, 19 Pages, 2003.

* cited by examiner

LOW POWER SYNCHRONIZATION IN A WIRELESS COMMUNICATION NETWORK

PRIORITY CLAIM

This application claims priority to and the benefit of provisional patent application No. 62/083,111, titled "LOW POWER SYNCHRONIZATION IN A WIRELESS COMMUNICATION NETWORK" and filed in the United States Patent and Trademark Office on Nov. 21, 2014, the entire content of which is incorporated herein by reference.

TECHNICAL FIELD

Aspects of the present disclosure relate generally to wireless communication systems, and more particularly, to timing synchronization of wireless communication devices with network timing.

BACKGROUND

Wireless communication networks are widely deployed to provide various communication services such as telephony, video, data, messaging, broadcasts, and so on. Such networks support communications for multiple wireless devices, of potentially numerous different device categories or types. In many cases, a wireless device is a battery-powered device, for which a long battery life is an important concern. One way some devices improve their battery life is by entering a sleep or power saving state for extended periods of time. In this state, various power-hungry components may be shut down, such as a power amplifier, crystal oscillator, etc.

When such a device wakes from the sleep state, and in particular when the sleep state has a long duration, any clock that keeps time at the device may tend to drift, relative to the system time of the rest of the network. Accordingly, the device re-synchronizes with the network to enable communication. This synchronization process generally includes the reception of a synchronization (sync) signal broadcast from a base station and adjustment of clock timing based on the sync signal.

While this sleep and wake up procedure successfully reduces power consumption of mobile devices, there continues to be a need to improve their efficiency and battery life. As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Some aspects of the present disclosure provide for methods, apparatus, and computer software for low-power synchronization of wireless communication devices. In one example, an asynchronous code division multiple access (CDMA) channel may be utilized for uplink communication. By utilizing asynchronous CDMA on the uplink, synchronization requirements are relaxed relative to other forms of communication. Accordingly, a synchronization period after coming out of a sleep state can be short, reducing power consumption during re-synchronization.

In another example, a low-power companion receiver, rather than the full-power WWAN receiver, may be utilized to acquire a sync signal while the device is in its sleep state. Once synchronism is achieved via the low-power companion receiver, the full-power radio may power up and perform communication with the network. By shifting the synchronization from the full-power radio to the low-power companion radio, power consumption during re-synchronization can be achieved.

In one aspect, the disclosure provides a method of wireless communication operable at a wireless communication device. In this method, while a first transmitter and/or first receiver is in a sleep state, second receiver is woken for a synchronization period to listen for a synchronization signal from a wireless network, wherein the second receiver is configured to utilize less power to receive than the first receiver. The method further includes receiving the synchronization signal with the second receiver, establishing synchronism with the wireless network in accordance with the synchronization signal, and waking the first transmitter and/or receiver from the sleep state to communicate with the wireless network.

Another aspect of the disclosure provides a wireless communication device including means for communicating with a wireless network and means for receiving a synchronization signal from a wireless network. Here, the means for receiving the synchronization signal is configured to utilize less power to receive than the means for communicating with the wireless network. The wireless communication device further includes means for, while the means for communicating with the wireless network is in a sleep state, waking the means for receiving the synchronization signal for a synchronization period to listen for the synchronization signal. Still further, the wireless communication device includes means for establishing synchronism with the wireless network in accordance with the synchronization signal and means for waking the first transmitter and/or receiver from the sleep state to communicate with the wireless network.

Another aspect of the disclosure provides a non-transitory computer-readable medium storing computer executable code. The computer-readable medium includes instructions for causing a processor to, while a first transmitter and/or first receiver is in a sleep state, wake a second receiver for a synchronization period to listen for a synchronization signal from a wireless network, wherein the second receiver is configured to utilize less power to receive than the first receiver. Further, the computer-readable medium includes instructions for causing a processor to receive the synchronization signal with the second receiver, to establish synchronism with the wireless network in accordance with the synchronization signal, and to wake the first transmitter and/or receiver from the sleep state to communicate with the wireless network.

Another aspect of the disclosure provides a wireless communication device including a memory, a first transmitter and/or a first receiver, a second receiver for receiving a synchronization signal from a wireless network, wherein the second receiver is configured to utilize less power to receive than the first transmitter and/or first receiver, and at least one processor communicatively coupled to the memory, the first transmitter and/or first receiver, and the second receiver. Here, the at least one processor and memory are configured to, while the first transmitter and/or first receiver is in a sleep state, wake the second receiver for a synchronization period to listen for the synchronization signal from the wireless network; to receive the synchronization signal with the second receiver; to establish synchronism with the wireless network in accordance with the synchronization signal; and to wake the first transmitter and/or receiver from the sleep state to communicate with the wireless network.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to various aspects of the present disclosure, efficient synchronization algorithms for wireless communication devices in a wireless network are disclosed. The wireless network may take any of a number of suitable forms, including but not limited to a cellular network with a base station and one or more user equipment; a peer-to-peer (P2) network with a plurality of peer nodes; and/or a mesh network with a plurality of peer nodes. In some examples, asynchronous code division multiple access (CDMA) may be utilized for uplink communication, such that synchronization may be achieved utilizing this CDMA uplink. In this way, only frequency tracking and symbol-level synchronization are needed, as opposed to a full synchronization including frame-level synchronization utilized for other uplink multiple access schemes.

In other examples, a low-power companion receiver may be utilized within Internet of Everything (IoE) devices in order to acquire a downlink sync signal. In IoE devices with long sleep periods, the timing drift may become quite large while the IoE device is in its sleep state. Since, the ON duration of the receiver to obtain synchronicity is generally proportional to the timing drift (or, in some examples, maxes out according to the periodicity of the sync signal), significant power savings can be achieved by way of the use of the low-power companion receiver as described herein.

In general, synchronicity is obtained by receiving and detecting a synchronization sequence. Here, the received synchronization sequence is correlated with an expected sequence for all possible positions, including both time and frequency. When one position is detected to achieve a given criterion, such as a maximum energy, synchronicity is achieved according to that position.

Figure 1:
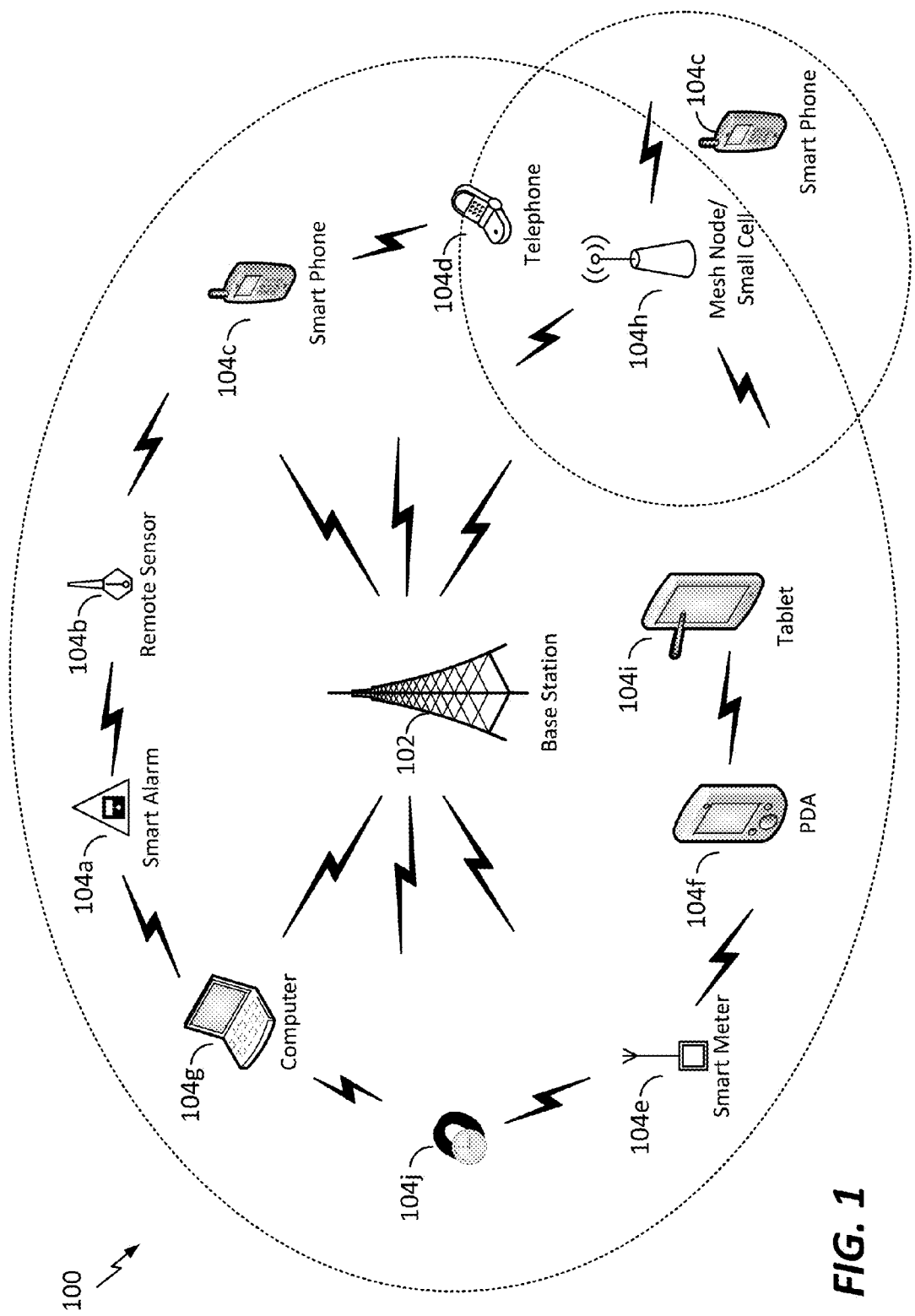
FIG. 1 is a schematic diagram of a wireless communication network according to some embodiments.

FIG. 1 is a schematic illustration of a wireless communication network 100 including multiple communication entities as it may appear in some aspects of the present disclosure. In the illustrated example, the network 100 includes a base station 102 and a small cell 104h. The base station 102 and/or small cell 104h may be optional in some networks, such as a peer-to-peer (P2P) network, where endpoints communicate with one another directly; however, in general, a wireless communication network 100 includes one or more entities that are capable of scheduling the utilization of time-frequency resources in the air interface. The network 100 further includes one or more user equipment (UE) or mesh nodes (described in further detail below), which may reside in, or be a part of, a smart alarm 104a, a remote sensor 104b, a smart phone 104c, a telephone 104d, a smart meter 104e, a PDA 104f, a personal computer 104g, a mesh node 104h, a tablet computer 104i, and/or a smart watch 104j. Of course, the illustrated devices or components are merely exemplary in nature, and any suitable node or device may appear within a wireless communication network 100 within the scope of the present disclosure. Also, as further discussed below, some wireless communication devices can change roles from time to time, acting at some times as a small cell or scheduling entity, and at other times as a user equipment or mesh node. Of course such a dual implementation may not occur in all scenarios.

In order to reduce power consumption and increase battery life, wireless communication devices such as some of those illustrated in FIG. 1 may periodically or intermittently enter a sleep state or other power saving state. For example, a sleep state may be one where a crystal oscillator (XO) and/or other various components of a device may be turned off or powered down.

When these devices undertake a cold start, waking from their sleep state, they are generally required to re-acquire synchronization with the wireless network. In general, to accommodate relatively low desired latency for a mobile-terminated call, a typical smart phone 104c may have a relatively short paging cycle where it wakes from the sleep state relatively frequently to listen for incoming page messages. For such devices, during short sleep states the timing drift is generally small and may in some cases fall within the pull-in range for the oscillator circuitry within the smart phone 104c to easily obtain synchronicity.

In some other devices, such as certain Internet of everything (IoE) devices, wake-up events may occur relatively frequently to accommodate low latency requirements, although not necessarily as frequently as the paging cycle in a smart phone. For example, a remote sensor 104b may be a component of some real-time data application where information from the remote sensor 104b may be requested at any time. In this case, the remote sensor 104b (or other suitable device) may be configured to perform the cold start, waking up from the sleep state every two seconds or so to listen for incoming page messages. For devices that undertake these relatively frequent wake-ups, their power consumption is typically dominated by the power utilized for page detection. The power consumption corresponding to the synchronization, while small compared to page detection, remains a good target for power savings. In particular, as described in further detail below, according to some aspects of the present disclosure, techniques that target the page detection phase for power savings, such as the utilization of a low-power companion radio, provide a mechanism for additionally targeting the synchronization phase for further power savings.

However, in some other types of IoE devices, the sleep state may continue for an extended period of time, e.g., from several minutes to several days. For example, IoE devices such as the smart meter 104e may wake up to send mobile-originated data once every 6 hours or so. With such an extended sleep, the timing drift of the device may in some cases be on the order of 2 seconds or more; thus, synchronization upon wake-up is an important procedure. Sparse wake-up events such as these may be driven by non-real-time applications running in the corresponding smart meter 104e (or other suitable device). For devices that undertake such a sparse wake up schedule, the overall power consumption of the device is generally dominated by the power consumption that occurs during the sleep state. Thus, while targeting the synchronization phase after a cold start for power savings for such sparse wake-up devices may help to some extent, the impact of such power savings may be less than that for devices with more frequent cold starts.

According to various aspects of the present disclosure, apparatus and/or methods are disclosed to provide for power savings for wireless communication devices (e.g., devices that wake from a sleep state) by targeting a synchronization phase for synchronizing the device with one or more other devices in a wireless communication network.

In certain examples carried out in a 3GPP Long-Term Evolution (LTE) network, timing uncertainty due to drift or frequency error in a UE's crystal oscillator may be taken into account by waking the UE in advance of an incoming transmission (e.g., a paging occasion), in order to acquire the system time. Here, the system time may be obtained either from the UE's serving cell or from some other cell. In some examples using a one-step wake-up, the UE may wake its modem and acquire the system time, and then maintain the modem in the on state until the paging occasion or other incoming transmission. However, in a case where timing uncertainty is large, the UE may need to wake substantially earlier than the paging occasion, resulting in relatively high power consumption. Thus, in other examples, a two-step wake-up has been discussed, where the UE wakes its modem to acquire the system time well before the paging occasion, and then re-enters a deep sleep state. The UE later wakes just before the paging occasion. While this two-step wake-up can save some power relative to the one-step wake-up under certain conditions, there remains a desire to continue improving the power consumption performance of wireless communication devices.

As indicated above, while the above example relates to an LTE network, the techniques described herein are not limited to LTE, and may also be used for various wireless communications systems. The terms "system" and "network" are often used interchangeably. For example, a code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including evolved versions of these networks such as fifth-generation or 5G networks.

Figure 2:
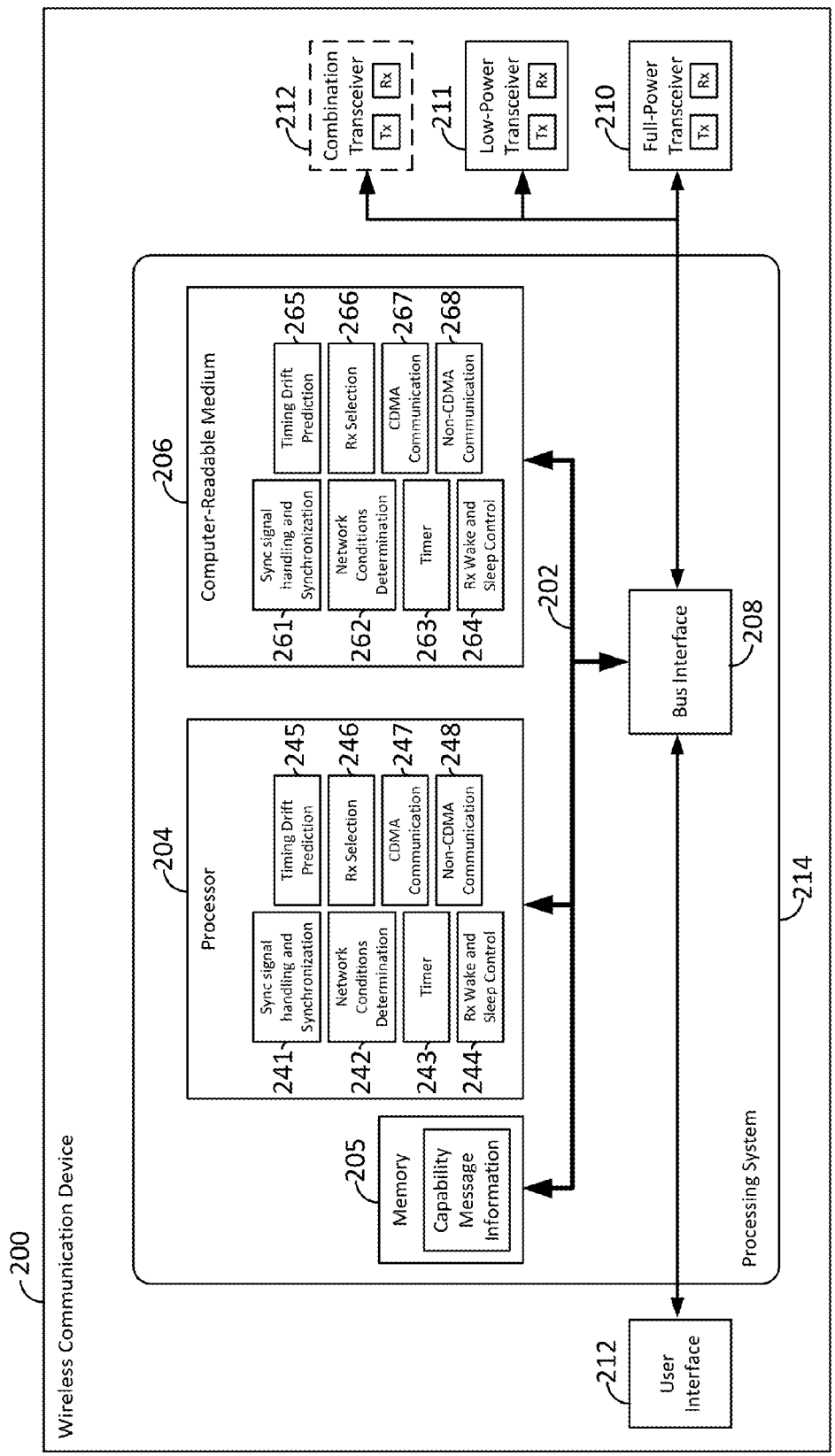
FIG. 2 is a block diagram illustrating an example of a hardware implementation for a user equipment (UE) employing a processing system according to some embodiments.

FIG. 2 is a block diagram illustrating an example of a hardware implementation for an apparatus (e.g., a wireless communication device) 200 employing a processing system 214 in accordance with various aspects of the present disclosure. As described in further detail below, the wireless communication device 200 may be configured for achieving synchronization in a wireless communication network in a power efficient manner. The wireless communication device 200 may in various examples be an IoE device such as any of the devices 104a-j illustrated in FIG. 1. In accordance with various aspects of the disclosure, an element, or any portion of an element, or any combination of elements may be implemented with a processing system 214 that includes one or more processors 204. For example, the apparatus 200 may be a network node, base station (BS), relay, user equipment (UE), Internet-of-everything (IoE) device, or other wireless communication device. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 204, as utilized in an apparatus 200, may be used to implement any one or more of the processes described below.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and one or more transceivers, such as a full-power transceiver 210, a low-power transceiver 211, and/or a combination transceiver 212. The transceiver or transceivers 210, 211, and/or 212 provide means for communicating with various other apparatus over a transmission medium. In various examples, the transceiver(s) 210, 211, and/or 212 may include or be coupled with one or more antennas, and in multi-antenna examples, may be enabled to determine an angle from which a received signal arrives. The transceiver(s) 210, 211, and/or 212 may include various sub-components configured to enable wireless communication, including but not limited to one or more power amplifiers, a transmitter, a receiver, filters, oscillators, etc. Depending upon the nature of the apparatus, a user interface 213 (e.g., keypad, display, speaker, microphone, joystick) may also be provided.

As used in the present disclosure, reference may be made to the low-power transceiver 211 by referring to a low-power receiver 211. Similarly, reference may be made to the full-power transceiver 210 by referring to the full-power receiver 210. In either case, this is merely for ease of reference when referring to the receiver portion or function of the respective low-power transceiver 211 or full-power transceiver 210.

In one particular example, the low-power transceiver 211 may include a super-regenerative receiver (SRR). An SRR receiver is known to those of ordinary skill in the art, and accordingly, the details of its implementation are not provided in the present disclosure. SRRs provide for a low active current consumption, while being capable of non-coherent detection of an on-off keying (OOK) waveform. Of course, various aspects of the disclosure are not limited to an OOK waveform for a synchronization or reference signal, and within the scope of the disclosure, any suitable waveform may be utilized, including but not limited to a frequency shift keying (FSK) waveform, an amplitude shift keying (ASK) waveform, etc.

In another example within the scope of the present disclosure, a single transceiver (i.e., a variable complexity combination transceiver 212) may be utilized within a wireless communication device 200, wherein the transceiver 212 is configured to enable a low complexity mode and a full complexity mode. Here, power consumption from the combination transceiver 212 may be lower in the low complexity mode, relative to the full complexity mode. This may be accomplished in any suitable manner, and in some examples may result in trade-offs such as one or more performance parameters becoming reduced, such as having poorer jammer rejection, the support of only simplified modulation schemes, etc. Within the description that follows, although the dual-radio example is described, it is to be understood that the algorithms and functionality may be modified to function with such a combination transceiver 212.

The processor 204 is responsible for managing the bus 202 and general processing, including the execution of software stored on the computer-readable medium 206. The software, when executed by the processor 204, causes the processing system 214 to perform the various functions described below for any particular apparatus. The computer-readable medium 206 may also be used for storing data that is manipulated by the processor 204 when executing software.

In various aspects of the disclosure, the processor 204 may include synchronization (sync) signal handling and synchronization circuitry 241 configured to utilize one or more of the transceivers 210, 211, and/or 212 to receive and detect an incoming sync signal, and in accordance with the sync signal, to synchronize the wireless communication device 200 with a wireless network. In some examples, the sync signal handling and synchronization circuitry 241 may operate in coordination with sync signal handling and synchronization software 261 stored on the computer-readable medium 206. The processor 204 may further include network conditions determination circuitry 242 configured to detect and/or determine one or more conditions of the wireless network. Network conditions may include a measured signal strength from a base station or peer node, a noise and/or interference value, a signal to noise ratio (or signal to noise and interference ratio), etc. Such determined network conditions may be utilized by the wireless communication device 200 for any suitable purpose, including but not limited to the selection between the low-power transceiver 211 and the full-power transceiver 210. In some examples, the network conditions determination circuitry 242 may operate in coordination with network conditions determination software 262 stored on the computer-readable medium 206. The processor 204 may further include a timer 243 configured for keeping time, e.g., based on the function of a crystal oscillator (XO). The timer may function while the wireless communication device 200 is in a sleep state and in an awake state, although in some examples the timer may be less than perfectly accurate and may drift, and exhibit some uncertainty over time. In some examples, the timer 243 may operate in coordination with timer software 263 stored on the computer-readable medium 206. The processor 204 may further include receiver wake and sleep control circuitry 244 configured to control the transition of receivers within the transceivers 210, 211, 212, and their sub-components, to enter into higher power (wake) and lower power (sleep) states for power savings. In some examples, the receiver wake and sleep control circuitry 244 may operate in coordination with receiver wake and sleep control software 264 stored on the computer-readable medium 206. In some examples, the processor 204 may further include timing drift prediction circuitry 245 configured to predict an amount of drift of the timer 243 during sleep periods managed by the receiver wake and sleep control circuit 244. This prediction may be predicated upon a known uncertainty of the crystal oscillator utilized by a given receiver, an amount of time that has passed, a temperature of the wireless communication device 200, and other suitable factors that may affect the timing drift during a sleep state. In some examples, the timing drift prediction circuitry 245 may operate in coordination with timing drift prediction software 265 stored on the computer-readable medium 206. The processor 204 may further include receiver selection circuitry 246 configured to select whether to utilize the low-power transceiver 211 or the full-power transceiver 210 to receive the sync signal. Receiver selection may be made in accordance with any suitable factors, including but not limited to network conditions as determined by circuitry 242, and/or the predicted timing drift according to the timing drift prediction circuitry 245. In some examples, the receiver selection circuitry 246 may operate in coordination with receiver selection software 266 stored on the computer-readable medium 206. The processor 204 may further include CDMA communication circuitry 247 configured to utilize one or more of the full-power transceiver 210, the low-power transceiver 211, and/or the combination transceiver 212 to transmit and/or receive utilizing a CDMA air interface. In some examples, the CDMA communication circuitry 247 may be configured for CDMA uplink communication, while some other channel access method is utilized for downlink communication. In some examples, the CDMA communication circuitry 247 may operate in coordination with CDMA communication software 267 stored on the computer-readable medium 206. In some examples, the processor 204 may further include non-CDMA communication circuitry 248 configured to utilize one or more of the full-power transceiver 210, the low-power transceiver 211, and/or the combination transceiver 212 to transmit and/or receive utilizing an air interface other than the CDMA air interface. In some examples, the non-CDMA communication circuitry 248 may operate in coordination with non-CDMA communication software 268 stored on the computer-readable medium 206.

One or more processors 204 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In the description below, an example utilizing an asynchronous CDMA uplink, and another example utilizing a dual-radio architecture are discussed. In either of these examples, the network (e.g., a base station or a P2P node) may transmit a sync signal to enable synchronization of a wireless communication device 200.

In some examples, the sync signal may include a system frame number (SFN) to help resolve timing ambiguity. That is, in a case where the wireless communication device 200 has been in a sleep state for a very long time, e.g., such that timing drift is beyond the periodicity of the sync signal, it may be difficult to resolve the synchronization. For example, for LTE networks, if the timing drift is beyond 10 ms the SFN may be reacquired through receiving the PBCH. By utilizing the SFN, any timing ambiguity that may arise from large timing drifts may be resolved.

Figure 3:
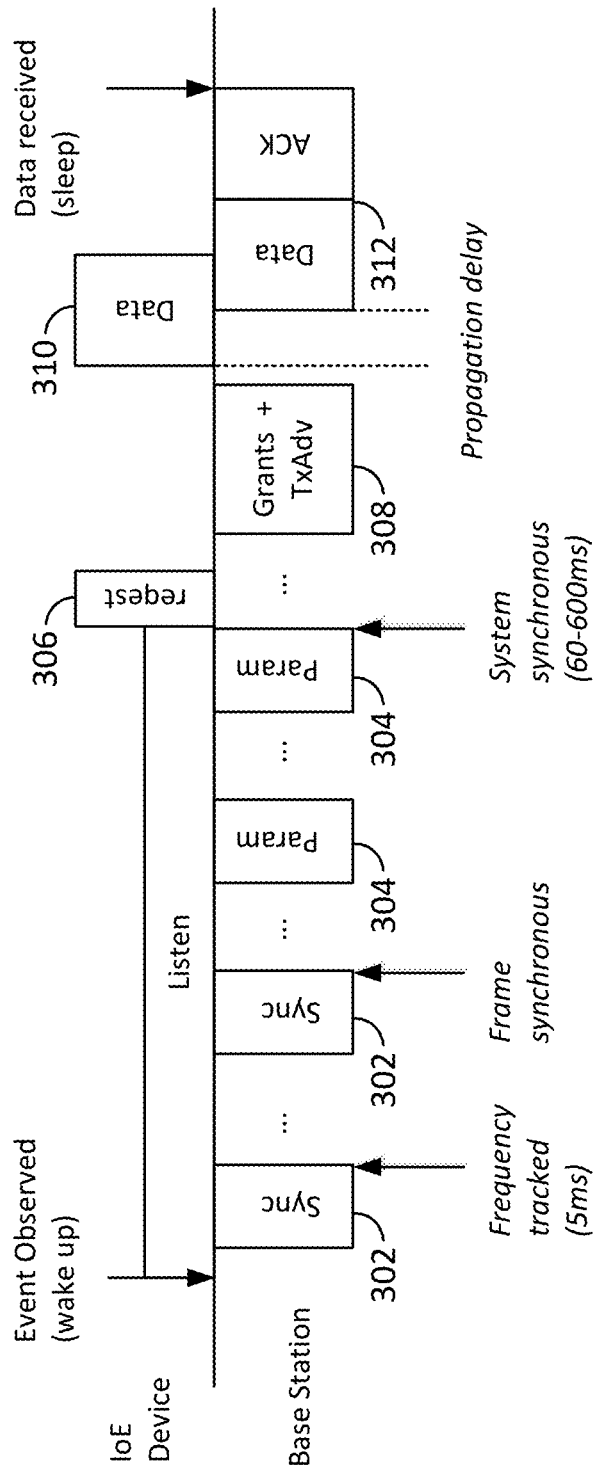
FIG. 3 is a timing diagram illustrating a conventional synchronization procedure in an LTE network.

FIG. 3 illustrates a timeline showing a synchronization procedure for an IoE device as it may take place in an LTE network. Here, the relevant LTE network may require frame-level synchronization, wherein the UE detects a sub-frame number within a frame. An LTE network may require frame-level synchronization because it is a scheduled system. Furthermore, since a scrambling sequence used may be based on the slot number within a frame (here, there are two slots within a subframe), the UE may fail to correctly exchange data with the eNB unless the UE obtains the correct frame timing. This frame-level synchronization, in which the frame boundaries and sub-frame numbers are known, is distinguished from system-level synchronization, wherein synchronization beyond the frame level (e.g., at the super-frame) is also obtained. In the illustrated example, every 5 ms a base station or eNB transmits a sync block 302, such as a primary synchronization signal (PSS) and/or a secondary synchronization signal (SSS). These signals PSS/SSS may also convey information including a cell ID. To establish frame synchronization, reception of two of these sync blocks is generally required. Because the sync blocks 302 are generally transmitted every 5 ms, the establishment of frame-level synchronization after a wake-up can take 10 ms or more.

Once frame-level synchronization is established, the IoE device may further receive from the network certain parameter (param) blocks 304, such as master information blocks (MIBs), system information blocks (SIBs), etc. For example, a system frame number (SFN) may be embedded in the MIB, which is carried on the physical broadcast channel (PBCH). Without obtaining the SFN, even though the IoE device may be frame synchronous, it is not yet system-synchronous. That is, the IoE device is not yet ready to transmit a scheduling request. The MIB may include other information, such as a system bandwidth and configuration for a HARQ indicator channel. It will be understood by those of ordinary skill in the art that the MIB/SIB transmissions utilized in LTE networks are merely one way to provide certain control information to a UE, and in other networks or systems, any suitable transmission or channel may be utilized, including broadcast and unicast formats.

When the IoE device obtains system synchronicity, it may transmit a scheduling request 306 to the network, as illustrated. After transmitting the scheduling request 306, the IoE device waits for a grant and Tx advance 308 from the base station. Here, a Tx advance function enables uplink synchronicity in a wireless network, since all transmitting devices in a cell must arrive at a base station utilizing the same time boundaries. Thus, in part based on the distance from the base station, a Tx advance signal may help achieve synchronicity in the network. Once synchronicity is achieved, the IoE device may finally communicate with the network, transmitting uplink data 310, receiving downlink data/ACK signals 312, etc.

As it may be gathered from the above description, in an LTE network substantial signaling messages are required from the base station in order to establish frame-level synchronization for devices such as the IoE device. However, by utilizing an asynchronous CDMA uplink as described further below, the synchronism required for the uplink may be relaxed, shortening the synchronization period during a cold start after large timing drifts (e.g., drifts greater than about 10 seconds with a 100 ppm clock).

Figure 4:
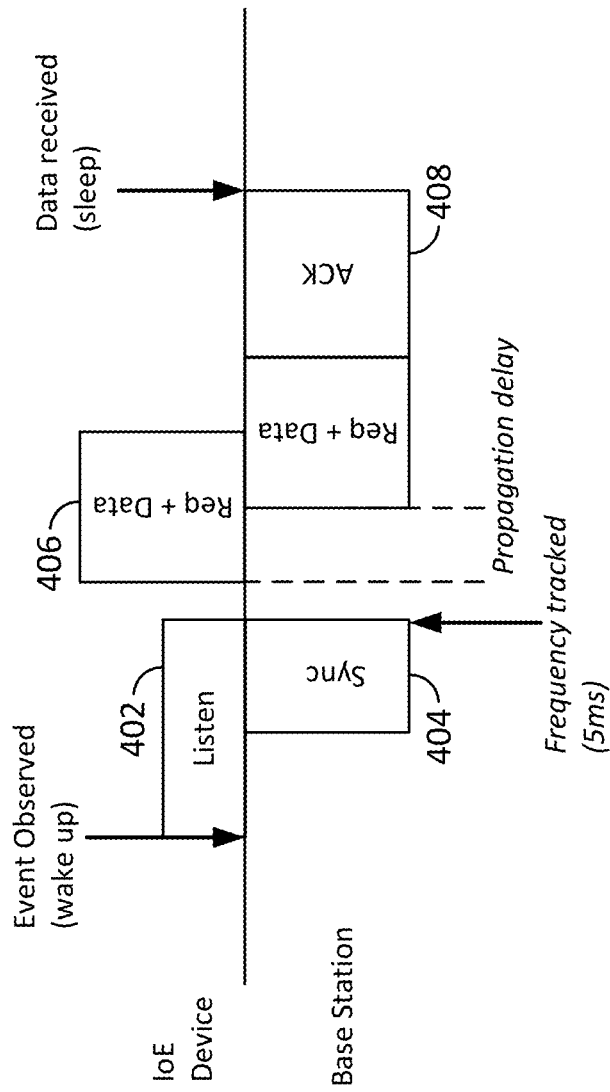
FIG. 4 is a timing diagram illustrating a synchronization procedure utilizing an asynchronous CDMA uplink according to some embodiments.

That is, by utilizing asynchronous CDMA for the uplink, a fairly simplified set of signaling may be utilized and relaxed synchronization requirements may be provided to accomplish data transaction with lower latency and active time. By shortening the synchronization period during a cold start, especially after large timing drifts, an asynchronous CDMA uplink may reduce power consumption in a wireless communication device. FIG. 4 is a timeline illustrating one example of a synchronization process utilizing asynchronous CDMA in accordance with some aspects of the disclosure. In this example, an IoE device is illustrated in communication with a base station 102. However, this is merely one example, and those of ordinary skill in the art will comprehend that this example may be applied to any suitable nodes in a wireless communication network, such as P2P nodes, mesh nodes, etc.

As seen in FIG. 4, an IoE or other wireless device may enable a listen period 402 upon the occurrence of any suitable event, such as a wake-up signal or timer, to monitor for signals such as synchronization signals, reference signals, control signals, and/or data signals. During the listen/sync period 402, the wireless IoE device may perform any other non-related operations, or in some examples, may wait for a communication burst to complete. To listen for these signals, the wireless communication device 200 may in some examples utilize the full-power transceiver 210 (referring to FIG. 2). That is, it may be the case that a wireless communication device utilizing a CDMA uplink may be equipped with a single transceiver only, and may accordingly utilize this transceiver 210 to listen for incoming synchronization signals. In another example, wherein the wireless communication device 200 is equipped with a low-power transceiver 211, if it is capable then the wireless communication device 200 may utilize the low-power transceiver 211 to receive the reference or synchronization signals from the wireless network.

At a given time (e.g., periodically), the base station or other P2P node may transmit a synchronization (sync) signal 404, which includes information for synchronizing wireless devices. This sync signal 404 may in some examples be broadcasted across a cell, and may utilize any suitable transmission format configured to be received by the wireless IoE device. In the case of PSS/SSS transmissions (as described above in connection with FIG. 3), the sync 404 transmissions may occur every 5 ms. Thus, with this period, the worst case delay to achieve frequency tracking would be 5 ms. Here, frequency tracking refers to obtaining synchronicity with the network frequency, although there may be some level of frequency error when frequency tracking is achieved. The wireless IoE device may further utilize a suitable frequency tracking loop (FTL) to correct for this error and obtain a frequency lock.

When the signal (e.g., the sync signal 404) is received, the wireless IoE device may establish synchronism with the network. That is, the wireless IoE device may obtain a frequency lock and timing synchronization with the wireless network in accordance with the sync signal 404. Here, the sync signal 404 may include any suitable sequence that facilitates the UE's detection of timing information. As one nonlimiting example, the sync signal 404 may include a pseudo-random number (PN) sequence. Whatever sequence is utilized in the sync signal 404, the wireless IoE device may correlate the received samples from this sequence and an expected sequence to obtain synchronicity.

In the example in FIG. 4 for LTE, certain control information such as the SFN, the system bandwidth, and HARQ indicator channel configuration were provided to the wireless IoE device utilizing a MIB. In the example of FIG. 4, by utilizing an asynchronous CDMA uplink, the SFN is no longer needed. Further, the system bandwidth and HARQ indicator channel configuration information, if needed, may be provided to the wireless IoE device by any suitable means or channel. Accordingly, this example omits the parameter transmissions 404 from FIG. 4.

Following the establishment of synchronism, the wireless IoE device may transmit a scheduling request and data 406. That is, because the uplink utilizes an asynchronous CDMA channel access mode, uplink transmissions do not require assigned resource blocks from the network. Accordingly the wireless IoE device may simply transmit its uplink data 406 once it obtains system synchronism, and without the delay seen in the LTE example of FIG. 3 where the device transmits a scheduling request 306, waits to receive a scheduling grant, and waits for the time of the granted resource to make the uplink transmission. Further, by utilizing the CDMA uplink, the wireless IoE device may bypass obtaining a timing advance parameter, described above in relation to FIG. 3. After a propagation delay and suitable processing time, the receiver of the uplink transmission 406 (e.g., a base station or other P2P node) may transmit an acknowledgment message 408, upon the receipt of which the wireless device may re-enter a sleep mode.

Note that the illustrated example assumes an uplink transmission, i.e., a transmission of uplink data 406 utilizing a CDMA channel access method from the wireless IoE device. However, aspects of the present disclosure are not limited thereto. That is, upon obtaining synchronism as illustrated in FIG. 4, the wireless IoE device may further listen for scheduled downlink transmissions, such as page indicator or page messages, and may accordingly receive downlink data from a base station or other data from any other network node such as a mesh node or P2P node. Here, the downlink data may utilize any suitable channel access method, not necessarily being CDMA. Further, by virtue of having obtained synchronism, the wireless IoE device may quickly transmit control information such as channel quality information (CQI) and/or packet acknowledgments (ACK) in response to downlink transmissions.

CDMA transmissions may be most useful for grants for small payloads and data rates. Longer transactions may in some examples require retransmission and closed loop power control, due for example to the probability of a collision with another device in the asynchronous network.

Although the uplink described herein utilizes CDMA, as indicated above, the downlink (i.e., transmissions received by the wireless IoE device) may utilize a synchronous channel access method in order to provide a general timing reference. Of course, in various examples, the downlink may be CDMA, or it may be OFDM or any other suitable multiplexing or channel access method. Further, by utilizing the asynchronous CDMA uplink, the TX-advance requirement to IoE devices prior to any uplink transmissions may be avoided. That is, unlike in an LTE network that utilizes an SC-FDMA uplink, asynchronous CDMA channels need not rely on any assurance that uplink transmissions arrive at the base station at known defined intervals. Accordingly, the elimination of the Tx-advance parameter can further reduce the overhead between the base station and a wireless IoE device in obtaining synchronism.

Figure 5:
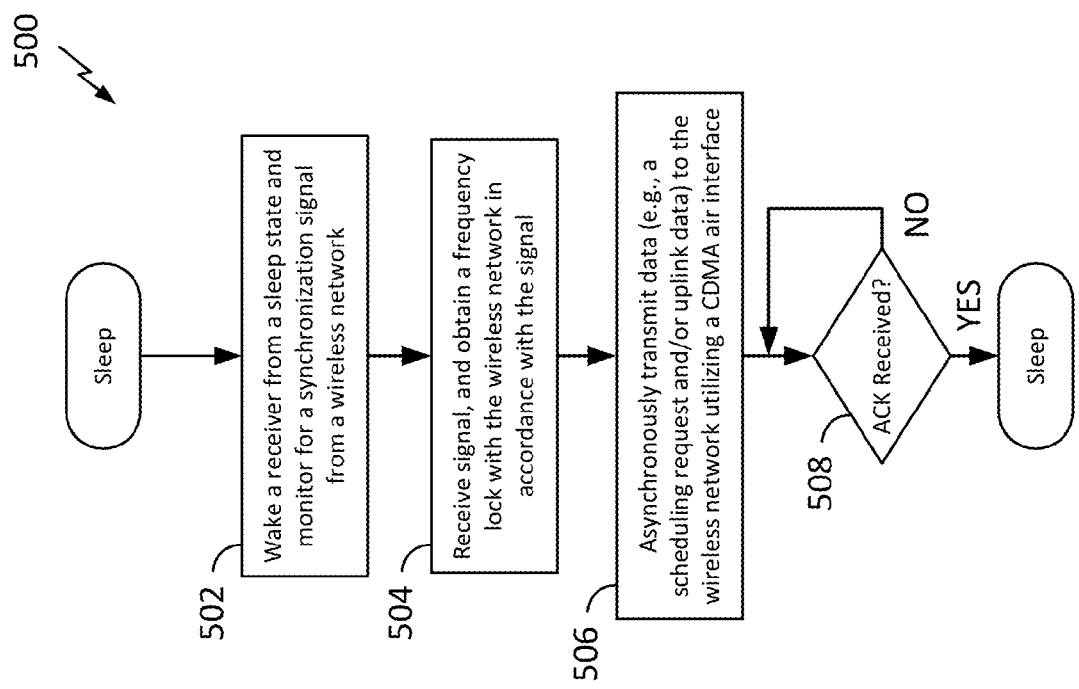
FIG. 5 is a flow chart illustrating a process for synchronization of a wireless communication device utilizing an asynchronous CDMA uplink according to some embodiments.

FIG. 5 is a flow chart illustrating an exemplary process 500 for synchronization of a wireless communication device 200 configured to utilize a CDMA channel access mode for uplink transmissions, in accordance with some aspects of the present disclosure. In various examples, the process 500 may be implemented by an IoE device such as the devices 104a-104j illustrated in FIG. 1; a wireless communication device 200 as illustrated in FIG. 2; one or more processors such as the processor 204 illustrated in FIG. 2; or any other suitable apparatus or means for carrying out the described functions.

At block 502, the wireless communication device 200 may wake a receiver from a sleep state to monitor for a sync signal from a wireless network. The receiver that wakes in this block 502 may be any of the full-power receiver 210, the low-power receiver 211, or the combination transceiver 212 described above. The sync signal may include one or more of a reference signal, a control signal, a data signal, or any other suitable signal from which synchronicity between the wireless communication device 200 and the network may be achieved. At block 504, the wireless communication device 200 may receive the sync signal and obtain a frequency lock with the wireless network in accordance with the sync signal.

At block 506, the wireless communication device 200 may asynchronously transmit data to the wireless network utilizing a CDMA air interface. At block 508, the wireless communication device 200 may check whether it has received an acknowledgment (ACK) message corresponding to the transmitted data, and if so, then the wireless communication device 200 may return to the sleep state.

According to another aspect of the disclosure, a dual radio architecture may be utilized. This dual radio architecture may be referred to as a big-little architecture, and may be utilized to achieve synchronism in a wireless communication network utilizing relatively little power. This dual radio algorithm is generally not dependent on the modulation, the multiple access method, or the channel access method utilized, and accordingly, while a CDMA uplink may be utilized, as in the prior example, the present algorithm is not limited thereto, and any suitable multiple access scheme may be utilized in the uplink and the downlink directions.

For example, as illustrated in FIG. 2, described above, a wireless communication device 200 (e.g., an IoE device) may include a first radio and a second radio. As one illustrative example, these radios may be a low-power transceiver 211 and a full-power transceiver 210, each of which may include a transmitter and/or a receiver. Here, the terms low-power and full-power are not intended to be limiting in nature, and in general are merely intended to convey that the low-power transceiver 211 may utilize less power for wireless communication than that of the full-power transceiver 210. In some examples, the low-power transceiver 211 may additionally be a low-complexity receiver, i.e., having simplified circuitry and/or functionality relative to that of the full-power transceiver. Further, in some examples, an energy detection-based receiver, or other suitable low-power receiver may be utilized.

Figure 6:
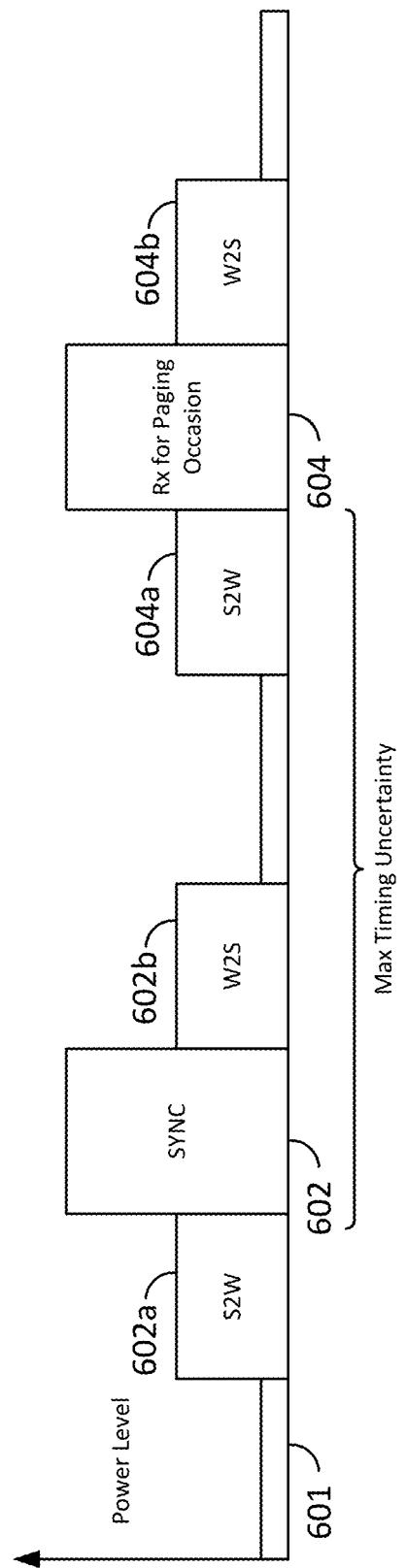
FIG. 6 is a timing diagram illustrating a simplified synchronization procedure utilizing a full-power receiver at a wireless communication device.
Figure 7:
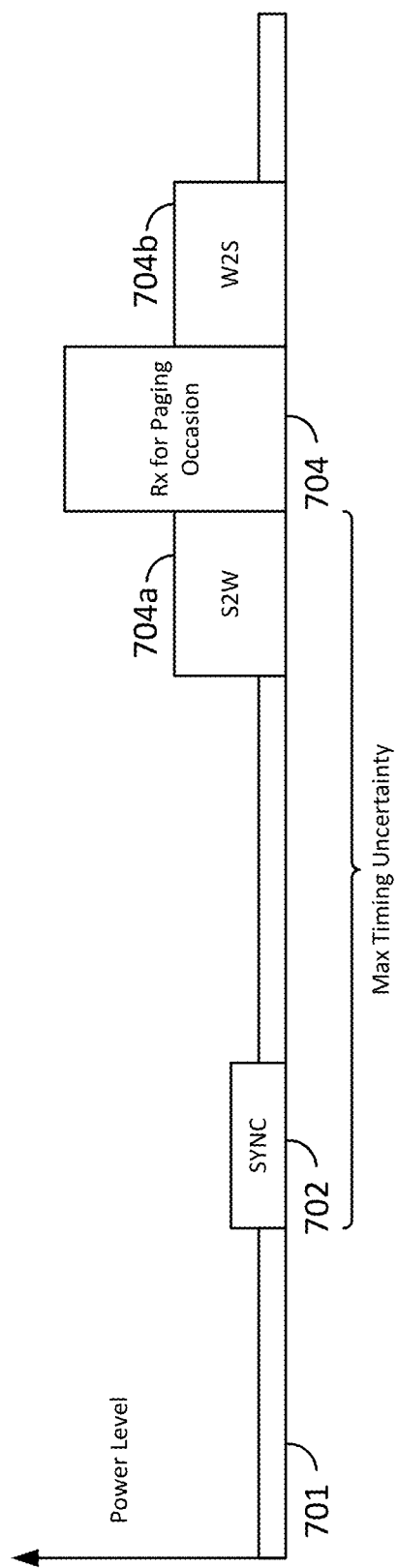
FIG. 7 is a timing diagram illustrating a simplified synchronization procedure utilizing a dual-radio architecture including a low-power receiver at a wireless communication device according to some embodiments.

By utilizing such a dual radio architecture, the wireless communication device 200 may be capable of reducing how often it needs to wake up its full-power receiver 210. This aspect is illustrated in FIGS. 6 and 7. For example, with reference to FIG. 6, an exemplary synchronization procedure is illustrated as it may take place utilizing a single receiver (i.e., the full-power receiver 210). In the illustrated timeline, the vertical axis illustrates the amount of power that may be consumed by the wireless communication device at a given time, and the horizontal axis shows the progression of time.

As seen in this illustration, a baseline power consumption level occurs when the device is in a sleep state 601. Here, a sync period 602 may occur at a given time, e.g., periodically or triggered by any suitable event. During the sync period 602, the full-power receiver 210 receives and detects a sync or reference signal, and utilizes information in the sync or reference signal to obtain synchronicity with the network, as described above. The amount of power consumed by the full-power receiver 210 may be relatively high, illustrated by the relatively high level during the sync period 602. Following the sync period 602, a reception period 604 is illustrated, wherein the full-power receiver 210 once again powers on to receive an incoming transmission (e.g., a page message or other downlink message). Note that this period being a reception period is merely one example to illustrate certain principles, and in other examples a transmit period may occur rather than the reception period.

As illustrated, for each of the sync period 602 and the reception period 604, not only is there power consumed during these given periods where the full-power receiver 210 is powered on, but in addition, each of these periods also includes a ramp-up and a ramp-down period. For example, the sync period 602 is immediately preceded by a sleep-to-wake period 602a, and is immediately followed by a wake-to-sleep period 602b. Similarly, the reception period 604 is immediately preceded by a sleep-to-wake period 604a, and is immediately followed by a wake-to-sleep period 604b. These ramp-up, or sleep-to-wake periods and ramp-down, or wake-to-sleep periods are illustrated as utilizing less power than that during the sync period 602 or the reception period 604, but greater power than that during the sleep period 601.

It may be noted that in many cases, if it is possible for the reception period 604 immediately to follow the sync period 602, then the full-power receiver 210 may remain in its on state without ramping down and back up again in the wake-to-sleep period 602b and the sleep-to-wake period 604a. However, if the timing drift is large enough, which may be the typical case, there is a sufficiently large gap between the full-power receiver's on time during the sync period 602 and the target data transmit or receive time 604 that returning to the sleep state is the best option. That is, because the full-power receiver 210 is relatively power hungry, typically a gap of several tens of milliseconds or beyond would mean that it is most economical for the full-power receiver 210 to sleep during all or most of this gap.

Accordingly, as in the scenario illustrated in FIG. 6, the full-power receiver 210 would effectively have to wake-up twice for each communication occasion. According to an aspect of the present disclosure, however, a dual radio synchronization utilizing a low-power companion radio 211 may reduce one such wake-up for each communication occasion.

Referring now to FIG. 7, a simplified synchronization procedure is illustrated utilizing a low-power receiver 211. As seen here, it may be considered that the same level of baseline power consumption as in FIG. 6 may occur when the device is in a sleep state 701. Here, a sync period 702 may occur at a given time, as in the example in FIG. 6. However, here, the low-power receiver 211 may be utilized to receive and detect the sync or reference signal. Accordingly, the amount of power consumed during the sync period 702 can be reduced relative to that if the full-power receiver 210 were utilized. Here, after achieving synchronicity, the wireless communication device 200 may return to the sleep state to conserve power, until such time as a paging occasion, reception period 704, or other occasion for receiving data utilizing the full-power receiver 210 may occur. Here, as in the example in FIG. 6, to utilize the full-power receiver 210, a sleep-to-wake period 704a may immediately precede the reception period 704, and a wake-to-sleep period 704b may immediately follow the reception period 704 so that the wireless communication device 200 may return to the sleep state.

As seen in this example, not only are power savings achieved by virtue of the lower power consumption during the sync period 702. Further, power savings are achieved by virtue of the potential to eliminate a ramp-up and ramp-down period (e.g., s2w 602a and w2s 602b in FIG. 6). Thus, by utilizing the low-power receiver 211 and reducing the occasions when the wireless communication device 200 needs to wake the full-power receiver 210, power savings can be achieved for a sync procedure.

In a further aspect of the disclosure, building on this two-step sync procedure as illustrated in FIG. 7, some wireless communication devices may be configured to perform the sync 702 more frequently. That is, in a case where timing uncertainty may grow very large, such as when the crystal oscillator frequency error is large and/or where a sleep state extends for a long duration, synchronization may require a number of steps such as obtaining not only frame-level synchronicity, but the superframe or other long-term sequence numbers may also be lost. Accordingly, a device configured with a low-power receiver 211 may be configured to perform the sync 702 more frequently. For example, in the illustration of FIG. 7, the sync 702 is shown being performed in advance of a scheduled paging occasion 704. Of course, sync before a paging occasion is not the only use case, and similar sync procedures may be performed in advance of (e.g., in anticipation of or in relation to) any scheduled transmission or receiving operation. This frequency or rate of sync procedures, occurring in advance, in anticipation, or in relation to scheduled transmitting or receiving operations, may be considered a first schedule. However, in an aspect of the present disclosure, a wireless communication device 200 may be configured to perform the sync procedure 702 according to a second schedule, more frequent than the first schedule. The second schedule may in fact be unrelated to the schedule for waking the transceiver from the sleep state to communicate with the wireless network, or any requirements of transmission or receiving operations, and may in some examples follow its own schedule. Accordingly, without expending large amounts of power thanks to the low-power nature of the low-power receiver 211, a wireless communication device 200 may sync more frequently, reducing or avoiding the possibility of a very large timing uncertainty arising at all.

Figure 8B:
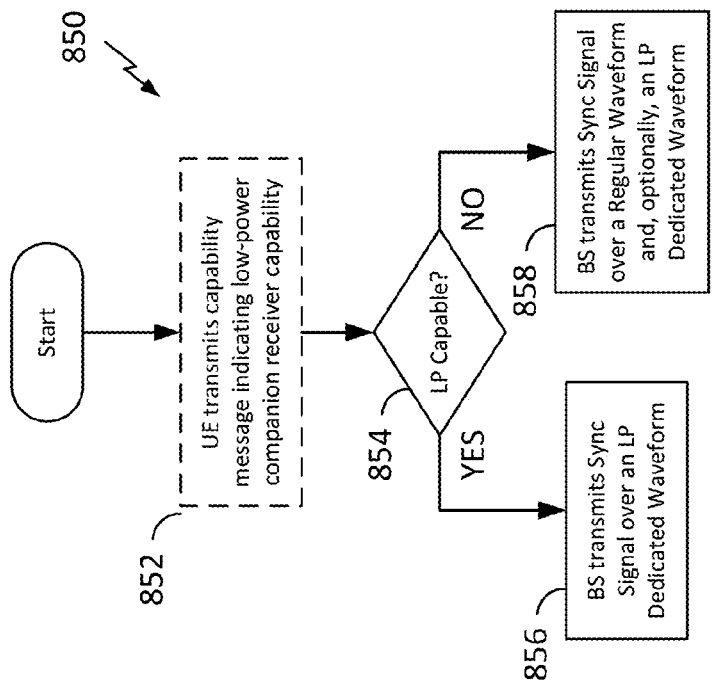
FIG. 8B is a flow chart illustrating a process for a base station or peer-to-peer node to select a suitable sync signal according to a received capability message according to some embodiments.
Figure 8A:
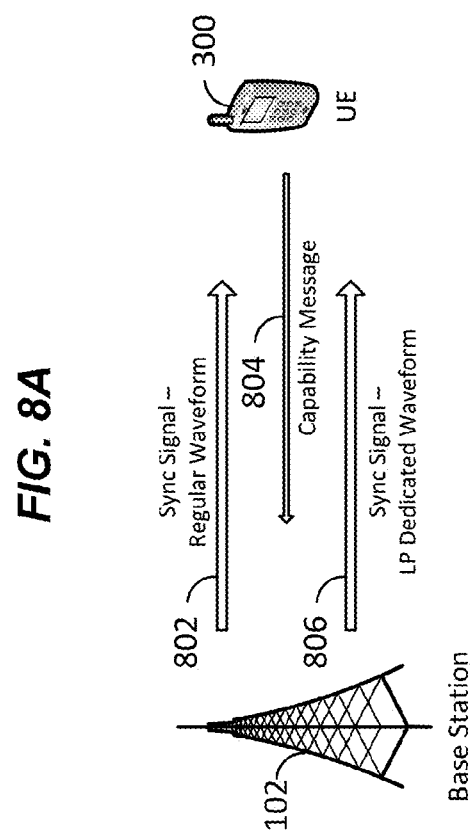
FIG. 8A is a schematic diagram illustrating the utilization of a capability message relating to dual-radio capabilities of a wireless communication device according to some embodiments.

In a further aspect of the disclosure, as illustrated in FIG. 8A, the wireless communication device 200 may be configured to provide to the network a capability message 804 that indicates that the wireless communication device 200 includes a low-power companion receiver 211. In addition or alternatively, the capability message 804 may indicate a low power companion receiver's support for different types of waveform, for multi-RAT or multi-carrier functionality, for paging channel decoding, etc.

That is, one exemplary option for the waveform supported by the low-power receiver 211 and indicated by the capability message, is that the low-power receiver 211 may be configured to receive a dedicated waveform 806 that the full-power receiver 210 is not designed to demodulate. For example, the low-power receiver 211 may be configured to receive a band, a carrier, a modulation, a coding scheme, or other transmission format that the full-power receiver 210 is not configured to receive. Thus, the base station 102 may transmit the sync signal to wireless communication devices 200 utilizing a dedicated waveform configured to be detected by the low-power companion receiver 211.

In another example, the base station 102 may be configured to transmit the sync signal to wireless communication devices 200 utilizing a regular waveform 802, e.g., a waveform that the full-power receiver 210 may be capable of receiving. Here, in some aspects of the disclosure, both the low-power receiver 211 and the full-power receiver 210 may be configured to be capable of demodulating the same waveform 802 utilized for the sync signal.

In a further aspect, the dual-radio architecture may enable the synchronization procedure to be operable in a multi-RAT architecture. That is, the low-power transceiver 211 may be configured for a first radio access technology (RAT), while the full-power transceiver may be configured for a second RAT. For example, the full-power transceiver may be wireless wide area network (WWAN) transceiver, while the low-power transceiver may be configured for wireless local area network (WLAN), Bluetooth, Zigbee, or any other suitable low-power RAT. However, within the present disclosure, the term RAT is not limited to different communication standards or protocols. That is, a multi-RAT architecture may include multi-carrier and/or multi-band architectures, even within a single communication standard or protocol. Thus, it may be the case that the low-power transceiver 211 may be configured for communication in a first carrier or band (e.g., synchronization on a sub-1 GHz band carrier), while the full-power transceiver 210 may be configured for communication in a second carrier or band (e.g., a 3.5 GHz band carrier). In this way, the lower-power RAT (or band or carrier) may be utilized for reacquisition and/or synchronization for one or more relatively power hungry RATs (or bands or carriers) in a multi-connectivity setting. Thus, in any of the exemplary algorithms described below, when reference is made to the low-power transceiver 211, it is to be understood that this low-power transceiver 211 may be operational in a RAT that is different than the RAT in which the full-power transceiver 210 operates.

In a further aspect of the present disclosure, in addition to assisting with the dual radio sync algorithm described below, the low power companion receiver 211 may also be used to monitor a paging indicator channel, and for node discovery in a mesh/peer-to-peer network.

For example, the paging of the wireless communication device 200 may be configured such that a paging indicator may be demodulated by the low-power transceiver 211. In this way, only the low-power transceiver 211 need be powered on to detect that paging indicator. Accordingly, only if the paging indicator channel indicates that there is a page message incoming for the wireless communication device 200, would the full-power transceiver 210 need to be powered on.

In any case, the capability message 804 transmitted from the wireless communication device 200 to the network may indicate such capabilities, and may in some examples only be sent relatively infrequently. For example, the capability message may be transmitted once during an initial context setup performed by the wireless communication device 200, and/or the capability message may be updated once during each radio resource control (RRC) connection setup procedure.

FIG. 8B is a flow chart illustrating a process 850 for waveform selection, and receiver selection, in accordance with some aspects of the present disclosure. As described, certain operations that are a part of process 850 may be implemented by a base station 102, a mesh node or small cell 104h, or any other suitable P2P node or scheduling entity. Further, certain operations that are a part of process 850 may be implemented by a wireless communication device 200, a wireless IoE device 104a-j, or any other suitable means for implementing the described functions.

At block 852, the wireless communication device 200 (e.g., a user equipment (UE) or other wireless IoE device) may transmit a capability message 804, as described, above, configured to indicate a capability of the wireless communication device 200 relating to a low-power companion receiver 211. At block 854, the base station 102 may determine in accordance with the capability message 804 the capabilities of the low-power receiver 211 of the wireless communication device 200. In some cases, if the wireless communication device 200 is capable of receiving and utilizing a sync signal transmitted over a dedicated waveform 806, then at block 856 the base station 102 may transmit the sync signal over the dedicated waveform 806. In this way, the wireless communication device 200 may maintain a full-power receiver 210 in a powered down state, while still achieving synchronicity with the network in accordance with the sync signal 806. However, even if the base station 102 receives the capability message 804 indicating that a wireless communication device 200 is capable of utilizing the dedicated waveform, it may be the case that other considerations, such as other devices in communication with the base station 102 lacking such a capability, may cause the base station 102 not to transmit the sync signal utilizing the dedicated waveform 806. That is, the base station 102 may transmit the sync signal utilizing the regular waveform 802 alone, or in other examples, may transmit the sync signal utilizing both the regular waveform 802 and the dedicated waveform 806.

Returning to block 854, if the capability message 804 transmitted from the wireless communication device 200 indicates that the wireless communication device 200 is not capable of utilizing the sync signal over the dedicated waveform 806, then at block 858 the base station 102 may transmit the sync signal utilizing the regular waveform 802. In some examples, the base station 102 may additionally transmit the sync signal over the dedicated waveform 806, e.g., wherein other devices in communication with the base station 102 may be capable of utilizing this sync signal. In this way, the wireless communication device 200 that transmitted the capability message 804 may obtain synchronicity utilizing the sync signal over the regular waveform 802, while other devices that may include the low-power receiver 211 capable of utilizing the sync signal over the dedicated waveform 806 may instead utilize that dedicated signal.

As indicated above, in some scenarios, it may be possible for a wireless communication device 200 to utilize either of its low-power receiver 211 or its full-power receiver 210 to receive an incoming sync signal. For example, if the sync signal utilizes a regular waveform 802, which may be detected by the full-power receiver 210, it may be the case that the low-power receiver 211 is also configured to be capable of detecting the sync signal. In another example, the base station 102 may transmit the sync signal utilizing both the regular waveform 802 and the dedicated waveform 806. In such scenarios, where the low-power receiver 211 and the full-power receiver 210 are both capable of demodulating the waveform utilized for the sync signal, then certain loose-coupling operations may be enabled. That is, the wireless communication device 200 may autonomously determine which receiver to use without affecting the operation at the network/base station/P2P node.

Figure 9:
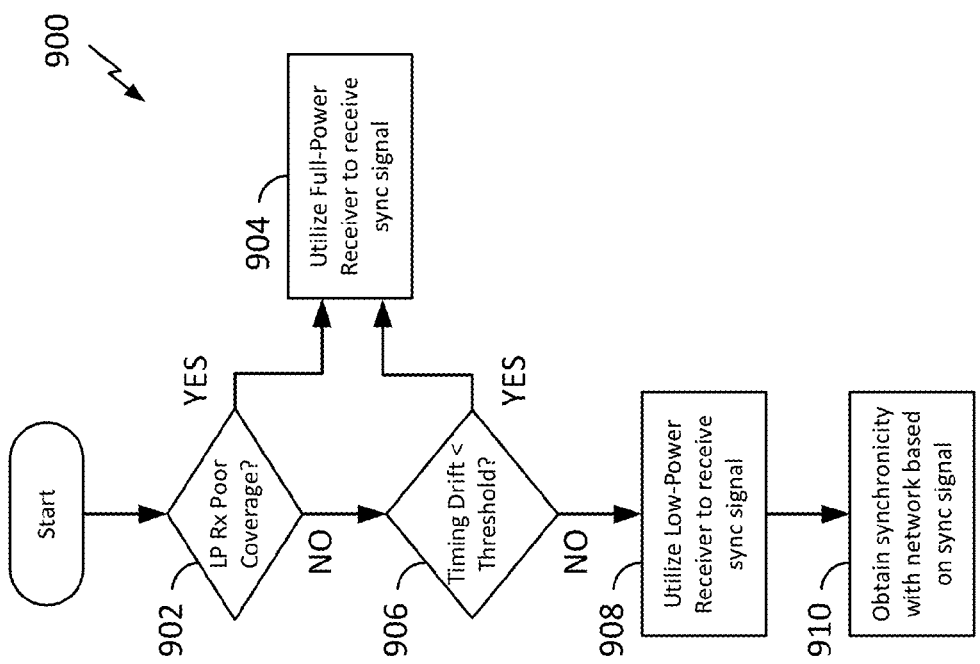
FIG. 9 is a flow chart illustrating a process for selecting whether to utilize a low-power receiver for synchronization of a wireless communication device according to some embodiments.

FIG. 9 is a flow chart illustrating a process 900 for a wireless communication device 200 to determine whether to utilize the low-power receiver 211 to receive or detect an incoming sync signal, according to some aspects of the disclosure. In various examples, the process 900 may be implemented by an IoE device such as the devices 104a-104j illustrated in FIG. 1; a wireless communication device 200 as illustrated in FIG. 2; one or more processors such as the processor 204 illustrated in FIG. 2; or any other suitable apparatus or means for carrying out the described functions. The process 900 may take place in scenarios where the sync signal is of a waveform both a low-power receiver 211 and a full-power receiver 210 are capable of receiving and demodulating. As described above, this may occur when sync signals are transmitted both on a dedicated waveform and on a regular waveform, and also when a low-power receiver 211 is capable of receiving and utilizing a sync signal carried on a regular waveform.

At block 902, the wireless communication device 200 may determine whether network coverage is poor. For example, if the wireless communication device 200 determines that the low-power receiver 211 would perform more poorly than the full-power receiver 210 according to detected network conditions, then the wireless communication device 200 may determine to utilize the full-power receiver 210 to detect the sync signal. Such a determination may be based on a variety of detected conditions. For example, if the low-power receiver 211 has poorer sensitivity than that of the full-power receiver 210, then in certain cases, such as if the wireless communication device 200 is in a poor coverage area (e.g., where the signal strength or other metric corresponding to network coverage is less than a suitable threshold), then the sensitivity of the low-power receiver 211 may be unsuitable to detect the sync signal. In another example, if the wireless communication device 200 is in the presence of strong RF interference (e.g., interference greater than a suitable interference threshold value) that the full-power receiver 210 is more capable of handling, then the wireless communication device 200 may similarly decide only to use the full-power receiver 210 without powering on the low-power receiver 211. In such cases, the process 900 may proceed to block 904, wherein the wireless communication device 200 may determine to utilize the full-power receiver 210 to receive the sync signal.

Other factors may additionally, or alternatively, be considered in determining whether to utilize the low-power receiver 211 for receiving the synchronization signal. For example, at block 906, the wireless communication device 200 may determine whether the timing drift is expected to be below a certain threshold (e.g., a predetermined threshold). That is, after waking from the sleep state, the wireless communication device 200 may predict, e.g., based upon how long the sleep state endured, the probability that the timing drift was greater or less than a given drift threshold. If the timing drift is expected to be below the threshold, then the energy saving achievable by using the low-power companion radio 211 may be negligible. In this case, only using the full-power radio 210 may be reasonable. Thus, the process 900 may proceed to block 904, and the wireless communication device 200 may utilize the full-power receiver 210 to receive the sync signal.

Whether or not the process 900 is followed by a given wireless communication device 200, in some scenarios, the low-power receiver 211 may be utilized to receive the sync signal. When the low power companion receiver 211 is utilized in a wireless communication device 200, according to various aspects of the disclosure, it can be used in several ways. Below, four exemplary use cases are provided: (1) sync and send when dealing with small timing uncertainty; (2) sync and send when dealing with high timing uncertainty; (3) sync and receive when dealing with small timing uncertainty; and (4) sync and receive when dealing with high timing uncertainty.

Figure 10:
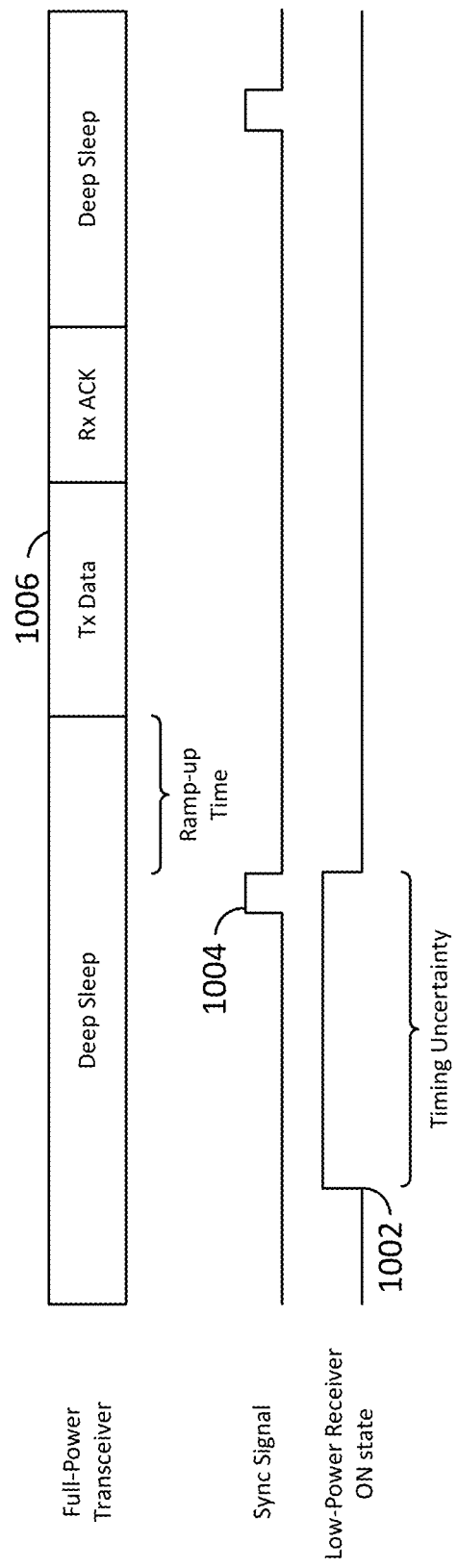
FIG. 10 is a timing diagram illustrating a synchronize and send procedure according to some embodiments.

FIG. 10 is a timing diagram that illustrates one example of a synchronize-and-send (sync and send) procedure as it may be implemented in accordance with some aspects of the present disclosure. The illustration shows the state of the full-power transceiver 210, the timing of the sync signal transmitted from the network/base station/P2P node, and the state of the low-power transceiver 211. At the beginning of the illustrated timeline, the full-power receiver 210 may be in a sleep state. As illustrated, the low-power receiver 211 may turn on at a given time 1002. The turn-on time 1002 of the low-power receiver 211 may be determined according to a timer or in response to any suitable event or trigger. The duration of the turn-on time of the low-power receiver 211 may correspond to the uncertainty of the timing, e.g., double the maximum time drift that is expected given the duration of the sleep state from which the device is waking. In this example, the timing uncertainty may be relatively small, e.g., due to a short sleep period for the full-power receiver 210.

While the low-power receiver 211 is on, a sync signal 1004 from the network may be received, as illustrated. The sync signal 1004 may be a sparse signal, only being infrequently transmitted from the network. Upon receiving, decoding, and synchronizing based on the sync signal 1004, the full-power transceiver 210 may be turned on. Here, there may be a suitable ramp-up time for the full-power transceiver 210, after which the full-power transceiver 210 may be utilized to transmit data 1006. In some examples, in order to attempt to avoid the possibility that too many devices may attempt to transmit their data at the same or similar time after the sync signal 1004, the actual time when the wireless communication device 200 transmits its data 1006 may be based on any suitable additional time offset (e.g., a random or pseudo-random offset or backoff time). That is, the ramp-up time delay illustrated in FIG. 10 is merely one example, and other delays may occur in other examples, e.g., including a predetermined backoff time.

Because the low-power transceiver 211 is configured to utilize less power than the full-power transceiver 210, and the full-power transceiver 210 may remain in its sleep state while the low-power transceiver 211 turns on for the resynchronization period, energy savings in the synchronization process may be achieved utilizing this algorithm. Specifically, the energy savings achieved in this example are equal to the following:

Energy saving:(full power $Rx$–low power $Rx$)*(timing uncertainty)

Figure 11:
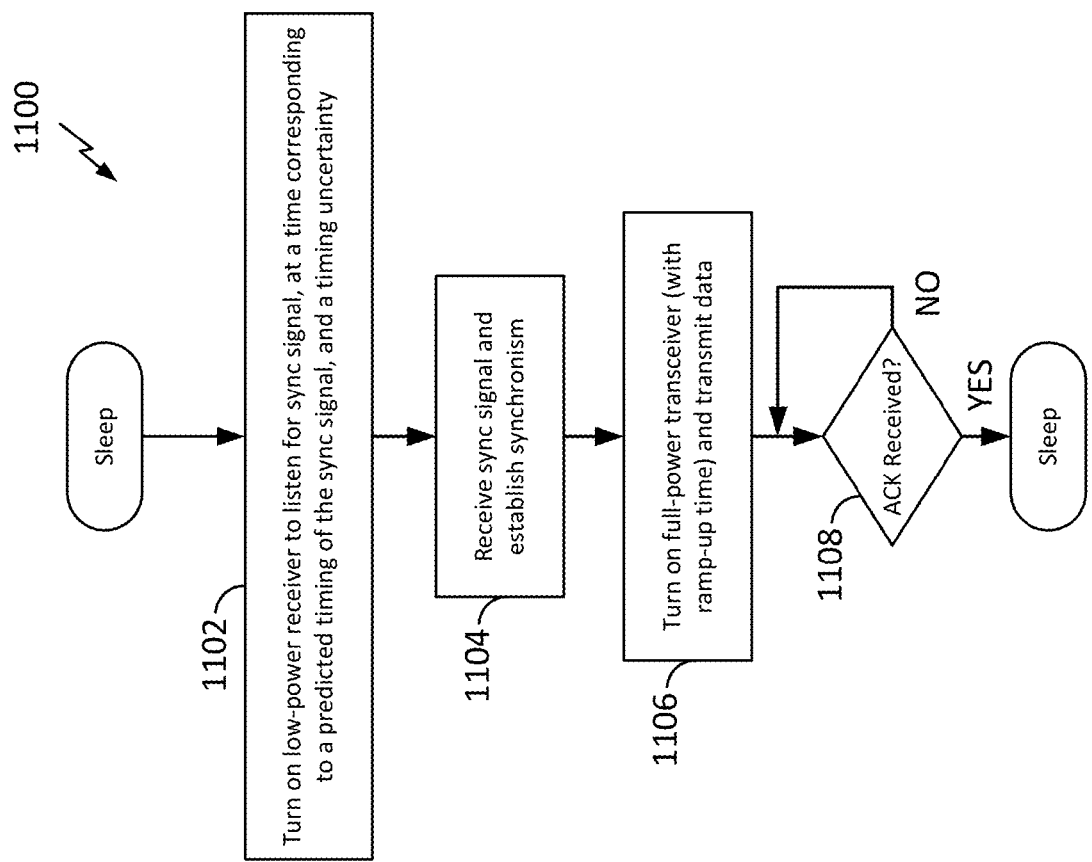
FIG. 11 is a flow chart illustrating the synchronize and send procedure of FIG. 10 according to some embodiments.

FIG. 11 is a flow chart illustrating an exemplary process 1100 for carrying out the algorithm described above in relation to FIG. 10. In various examples, the process 1100 may be implemented by an IoE device such as the devices 104a-104j illustrated in FIG. 1; a wireless communication device 200 as illustrated in FIG. 2; one or more processors such as the processor 204 illustrated in FIG. 2; or any other suitable apparatus or means for carrying out the described functions.

At block 1102, while a full-power receiver 210 remains in a sleep state, the wireless communication device 200 may turn on or wake a low-power receiver 211 for a sync period to listen for a sync signal from a wireless network. The time at which the low-power receiver 211 wakes may correspond to a predicted timing of the sync signal. Here, the wake time may further be offset by an uncertainty of the predicted timing. As used herein, timing uncertainty may refer to a predicted maximum timing drift, or a worst-case timing drift. The wireless communication device 200 may predict the maximum or worst case timing drift by making a calculation based on the known accuracy of the crystal oscillator (XO) utilized in the receiver, the length of time that the receiver was in the sleep state, and any other suitable factors or parameters that may affect the timing drift. As a simple example, if the worst case timing drift for a given XO is 1 ms for each hour, then the predicted worst-case timing drift may be calculated as 1 ms for each hour that the receiver was in its sleep state.

At block 1104, the wireless communication device 200 may receive the sync signal with the low-power receiver 211, and establish synchronism with the wireless network in accordance with the sync signal. Once synchronism is established, at block 1106, the wireless communication device may wake the full-power transceiver 210 from the sleep state to communicate with the wireless network, e.g., by transmitting data such as a scheduling request or other uplink data. Here, a suitable ramp-up time may precede the transmission period. In some cases, a back-off time (e.g., a random back-off time) may additionally precede the transmission of the uplink information to reduce collisions in networks utilizing a synchronous uplink channel access method. At block 1108, the wireless communication device 200 may determine whether an ACK has been received from the network corresponding to the uplink transmission, and when the ACK is received, the full-power transceiver 210 may return to its sleep state.

Figure 12:
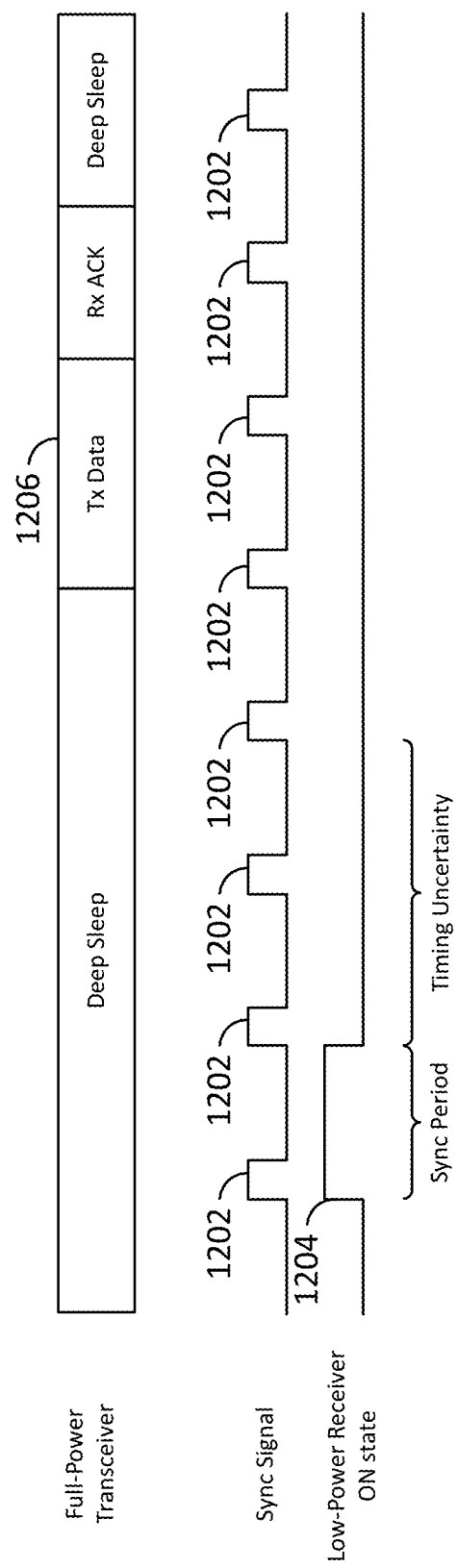
FIG. 12 is a timing diagram illustrating a synchronize and send procedure according to further embodiments.

FIG. 12 is a timing diagram that illustrates another example of a sync and send procedure as it may be implemented in accordance with some aspects of the present disclosure. While the above example shown in FIG. 10 shows how synchronicity may be achieved for low timing uncertainty, FIG. 12 shows how synchronicity may be achieved for higher levels of timing uncertainty.

As seen in this illustration, the sync signal 1202, transmitted from the network/base station/P2P node, may be periodic, and/or may be transmitted with a timing known to the wireless communication device 200. Here, at a given time 1204 the low-power transceiver 211 at the wireless communication device 200 may be turned on for a sync period, which may have a duration configured to overlap at least one sync signal 1202. In this way, the wireless communication device 200 may overlap at least one sync signal 1202, so that the wireless communication device 200 can catch that sync signal 1202. For example, in the case of a periodic sync signal 1202, the sync period where the low-power receiver 211 is turned on may be at least as long as one period of the sync signal transmission cycle. In this way, the low power receiver 211 may receive the information on the sync signal 1202 and synchronize with the network. Upon achieving synchronicity, the full-power transceiver 210 may power on, following a suitable ramp-up time and an optional additional wait time or backoff period (as described above) to transmit data 1206.

Compared to the algorithm described above with reference to FIGS. 10 and 11, the algorithm described here and illustrated in FIG. 12 may be more efficient in the case that the sync period 1204 (i.e., the duration during which the low-power receiver 211 is turned on to listen for the sync signal 1202) is substantially less than the timing uncertainty. For example, this may be the case after the full-power transceiver 210 is in a relatively long sleep state.

Figure 13:
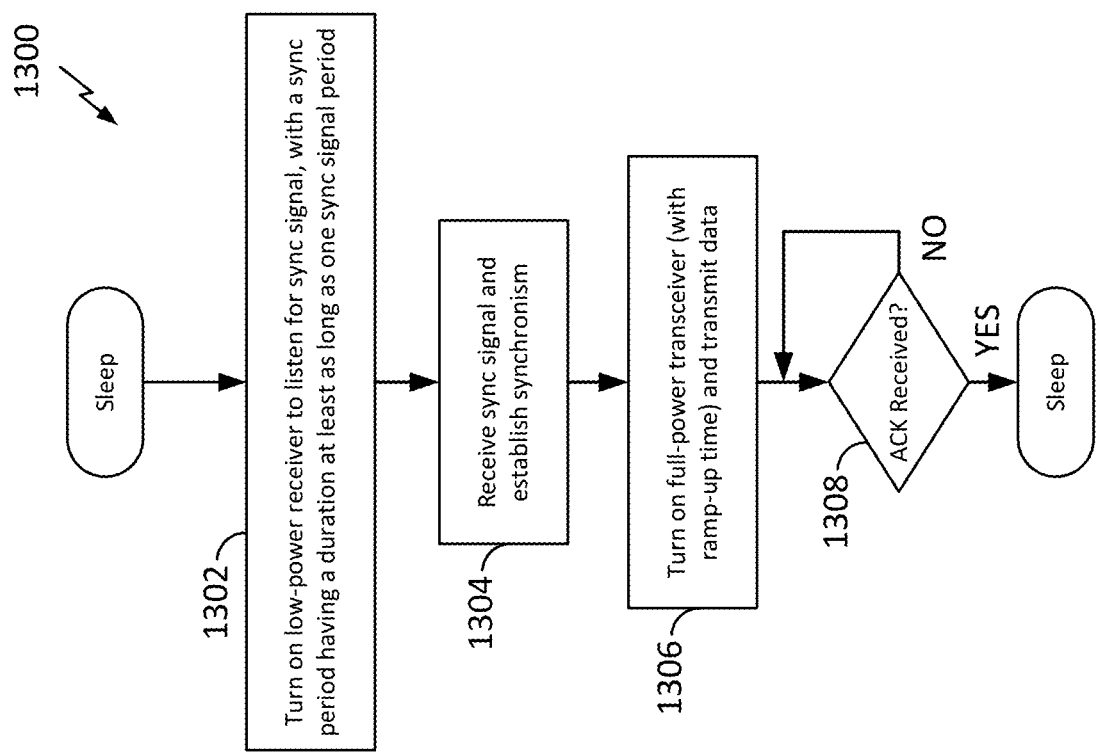
FIG. 13 is a flow chart illustrating the synchronize and send procedure of FIG. 12 according to some embodiments.

FIG. 13 is a flow chart illustrating an exemplary process 1300 for carrying out the algorithm described above in relation to FIG. 12. In various examples, the process 1300 may be implemented by an IoE device such as the devices 104a-104j illustrated in FIG. 1; a wireless communication device 200 as illustrated in FIG. 2; one or more processors such as the processor 204 illustrated in FIG. 2; or any other suitable apparatus or means for carrying out the described functions.

At block 1302, while a full-power receiver 210 remains in a sleep state, the wireless communication device 200 may turn on or wake a low-power receiver 211 for a sync period to listen for a sync signal from a wireless network. Here, the duration of the sync period during which the low-power receiver listens for the sync signal may be at least as long as one period of a periodic sync signal.

At block 1304, the wireless communication device 200 may receive the sync signal with the low-power receiver 211, and establish synchronism with the wireless network in accordance with the sync signal. Once synchronism is established, at block 1306, the wireless communication device may wake the full-power transceiver 210 from the sleep state to communicate with the wireless network, e.g., by transmitting data such as a scheduling request or other uplink data. Here, a suitable ramp-up time may precede the transmission period. In some cases, a back-off time (e.g., a random back-off time) may additionally precede the transmission of the uplink information to reduce collisions in networks utilizing a synchronous uplink channel access method. At block 1308, the wireless communication device 200 may determine whether an ACK has been received from the network corresponding to the uplink transmission, and when the ACK is received, the full-power transceiver 210 may return to its sleep state.

Figure 14:
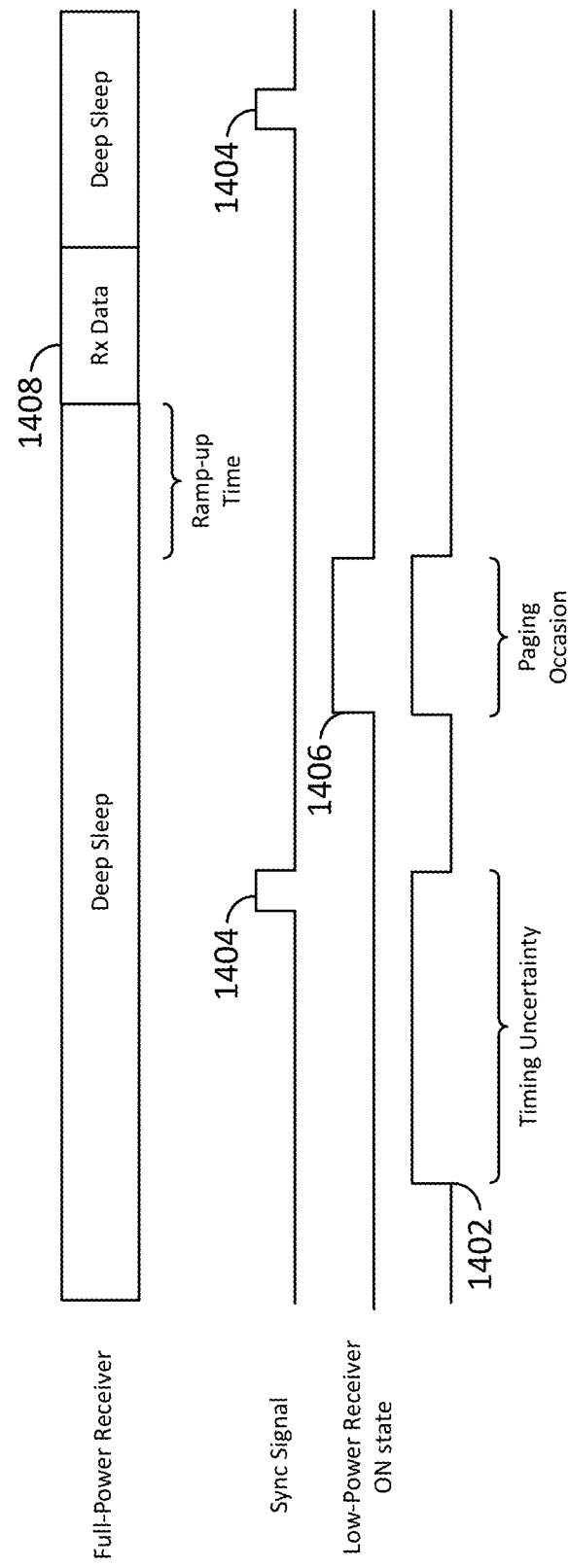
FIG. 14 is a timing diagram illustrating a synchronize and receive procedure according to some embodiments.

FIG. 14 is a timing diagram illustrating an example of a sync and receive procedure as it may be implemented in accordance with some aspects of the present disclosure. The illustration shows the state of the full-power transceiver 210, the timing of the sync signal transmitted from the network/base station/P2P node, the timing of a paging signal transmitted from the network/base station/P2P node, and the state of the low-power transceiver 211. At the beginning of the illustrated timeline, the full-power receiver 210 may be in a sleep state. As illustrated, the low-power receiver 211 may turn on at a given time 1402. The turn-on time 1402 of the low-power receiver 211 may be determined according to a timer or in response to any suitable event or trigger. The duration of the turn-on time of the low-power receiver 211 may correspond to the uncertainty of the timing, e.g., double the maximum time drift that is expected given the duration of the sleep state from which the device is waking. In this example, the timing uncertainty may be relatively small, e.g., due to a short sleep period for the full-power receiver 210.

While the low-power receiver 211 is on, a sync signal 1404 may be received, as illustrated. The sync signal 1404 may be a sparse signal, only being infrequently transmitted from the network. Upon receiving, decoding, and synchronizing based on the sync signal 1404, the wireless communication device 200 may compensate for any timing drift that may have occurred during the sleep state of the full-power transceiver 210.

In a further aspect of the disclosure, the low-power receiver 210 may be configured not only to receive and detect the sync signal 1404, which is generally transmitted on a broadcast channel, but further, to receive and detect a paging signal 1406. The paging signal 1406 may in some examples be a paging indicator, which is generally a short message or indicator that indicates the possible existence of a full page message incoming on a paging channel. In other examples, the paging signal 1406 may be the full page message. In various examples, the paging signal 1406 may be transmitted on a broadcast channel, but may additionally or alternatively be transmitted on a multicast or unicast channel.

By virtue of the synchronized timing accomplished by utilizing the low-power receiver 211 to catch the sync signal 1404, the wireless communication device 200 may accurately turn on the low-power receiver 211 to receive the paging signal 1406 (e.g., the paging indicator or the full page message) during a scheduled paging occasion. Here, if the paging occasion indicates to the wireless communication device 200 that data 1408 (e.g., the page message on a paging channel and/or downlink data on a traffic channel) is incoming to the wireless communication device 200, then after a suitable ramp-up time for turning on the full-power transceiver 210, the full-power transceiver 210 may be utilized to receive the page message or the data transmission 1408.

Accordingly, by utilizing the low-power transceiver 211 rather than the full-power transceiver 210 to turn on for a sync period and receive the sync signal 1404 as well as to receive the paging signal 1406, substantial energy may be saved for a sync and receive procedure. Specifically, the energy savings achieved in this example are equal to the following:

$$\text{Energy saving:(full power } Rx\text{-low power } Rx)*(\text{timing uncertainty+paging occasion})$$

Figure 15:
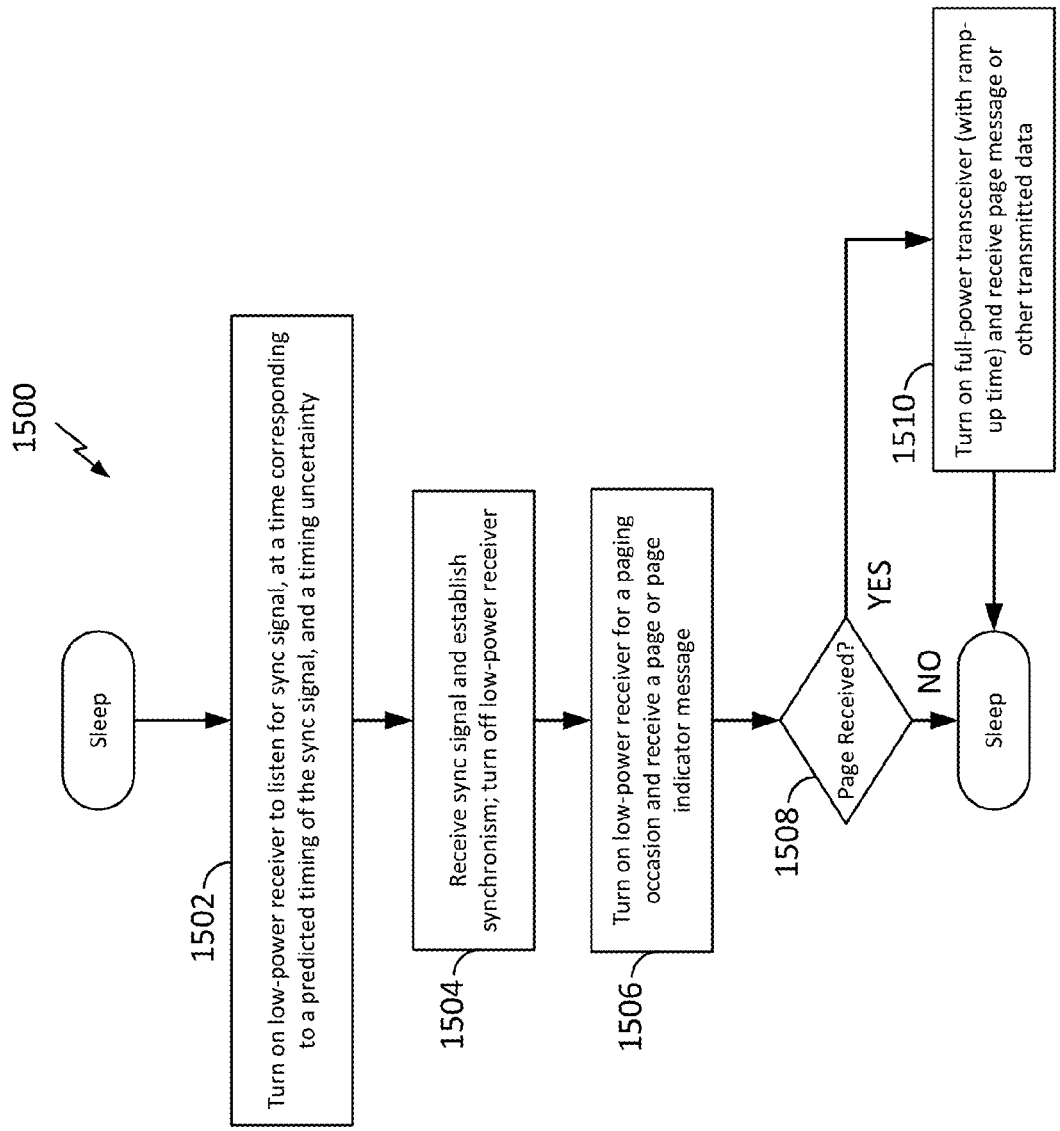
FIG. 15 is a flow chart illustrating the synchronize and receive procedure of FIG. 14 according to some embodiments.

FIG. 15 is a flow chart illustrating an exemplary process 1500 for carrying out the algorithm described above in relation to FIG. 14. In various examples, the process 1500 may be implemented by an IoE device such as the devices 104a-104j illustrated in FIG. 1; a wireless communication device 200 as illustrated in FIG. 2; one or more processors such as the processor 204 illustrated in FIG. 2; or any other suitable apparatus or means for carrying out the described functions.

At block 1502, while a full-power receiver 210 remains in a sleep state, the wireless communication device 200 may turn on or wake a low-power receiver 211 for a sync period to listen for a sync signal from a wireless network. The time at which the low-power receiver 211 wakes may correspond to a predicted timing of the sync signal. Here, the wake time may further be offset by an uncertainty of the predicted timing. As used herein, timing uncertainty may refer to a predicted maximum timing drift, or a worst-case timing drift. The wireless communication device 200 may predict the maximum or worst case timing drift by making a calculation based on the known accuracy of the crystal oscillator (XO) utilized in the receiver, the length of time that the receiver was in the sleep state, and any other suitable factors or parameters that may affect the timing drift. As a simple example, if the worst case timing drift for a given XO is 1 ms for each hour, then the predicted worst-case timing drift may be calculated as 1 ms for each hour that the receiver was in its sleep state.

At block 1504, the wireless communication device 200 may receive the sync signal with the low-power receiver 211, and establish synchronism with the wireless network in accordance with the sync signal. Once synchronism is established, at block 1506, the wireless communication device may again turn on the low-power receiver 211 for a paging occasion, so that the low-power receiver 211, having the capability to receive page information, may receive a page message or a page indicator message. At block 1508, the wireless communication device 200 may determine whether a page message for the wireless communication device 200 has been received. If not, then the device may return to the sleep state. However, if a page message has been received, then at block 1510, the wireless communication device 200 may turn on the full-power receiver 210 and receive a downlink transmission, such as a page message in the case that the low-power receiver 211 received a page indicator. In the case that the low-power receiver 211 received the page message, here, the full-power receiver 210 may receive downlink data transmitted on a traffic channel. Here, a suitable ramp-up time may precede the turning on of the full-power receiver 210. After receiving the downlink transmission, the wireless communication device 200 may return to its sleep state.

Figure 16:
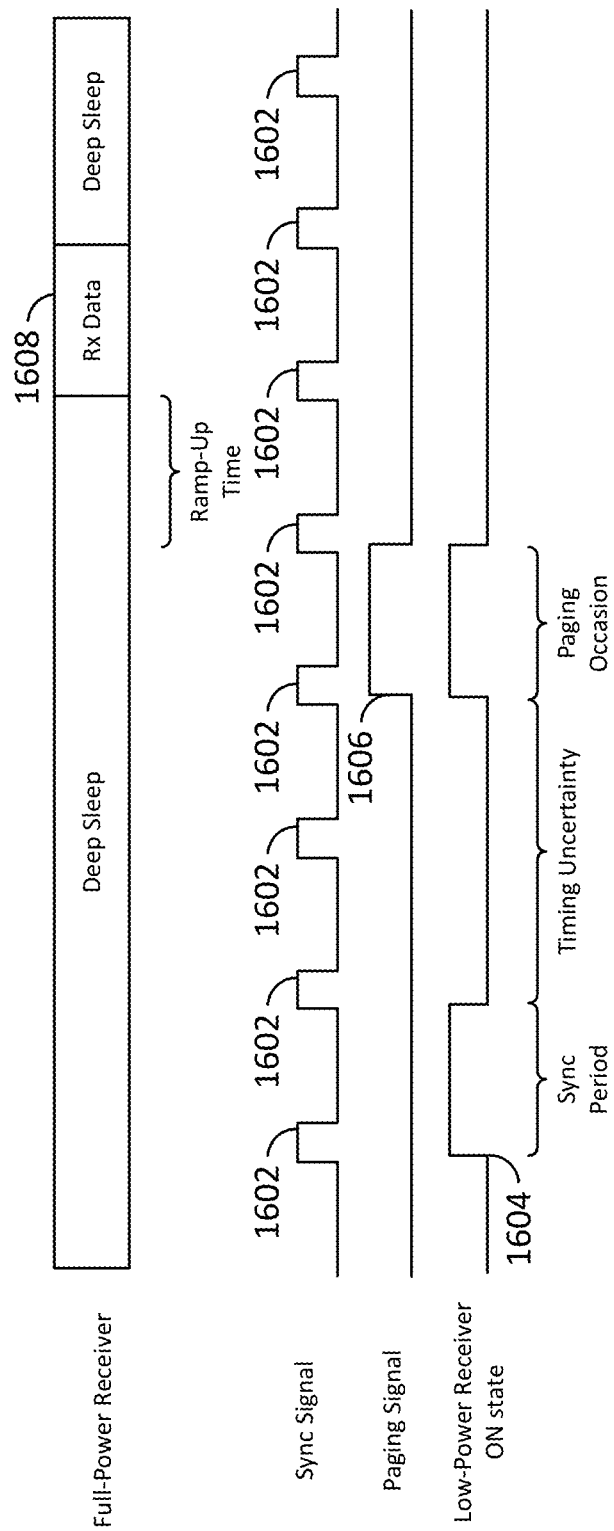
FIG. 16 is a timing diagram illustrating a synchronize and receive procedure according to further embodiments.

FIG. 16 is a timing diagram that illustrates another example of a sync and receive procedure as it may be implemented in accordance with some aspects of the present disclosure. While the above example shown in FIG. 14 shows how synchronicity may be achieved for low timing uncertainty, FIG. 16 shows how synchronicity may be achieved for higher levels of timing uncertainty.

As seen in this illustration, the sync signal 1602, transmitted from the network/base station/P2P node, may be periodic, and/or may be transmitted with a timing known to the wireless communication device 200. Here, at a turn-on time 1604 the low-power transceiver 211 may be turned on for a sync period, which may have a duration configured to overlap at least one sync signal 1602, so that the wireless communication device 200 can catch that sync signal 1602. For example, in the case of a periodic sync signal 1602, the sync period where the low-power receiver 211 is turned on may be at least as long as one period of the sync signal transmission cycle. In this way, the low power receiver 211 may receive the information on the sync signal 1602 and synchronize with the network.

In much the same way as described above in relation to FIG. 14, the low-power receiver 211 may further be utilized to receive a paging signal 1606 (e.g., a paging indicator or a page message). Here, if data is indicated to be for the wireless communication device 200, then the full-power transceiver 210 may be turned on in accordance with a suitable ramp-up time, to receive a data transmission 1608 (e.g., the page message on a paging channel and/or downlink data on a traffic channel).

Compared to the algorithm described above with reference to FIG. 14, the algorithm described here and illustrated in FIG. 16 may be more efficient in the case that the sync period (i.e., the duration during which the low-power receiver 211 is turned on to listen for the sync signal 1602) is substantially less than the timing uncertainty. For example, this may be the case after the full-power transceiver 210 is in a relatively long sleep state.

Figure 17:
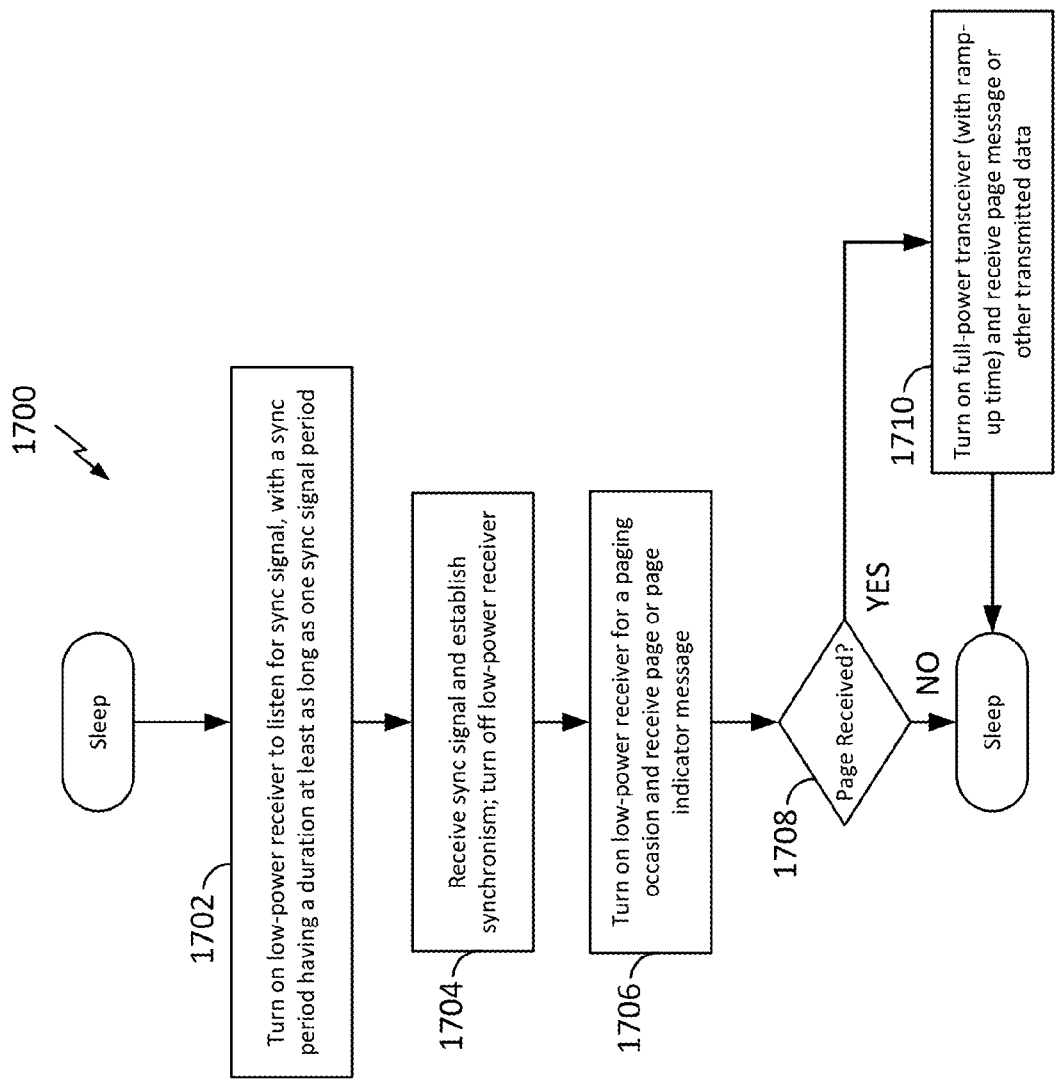
FIG. 17 is a flow chart illustrating the synchronize and receive procedure of FIG. 16 according to some embodiments.

FIG. 17 is a flow chart illustrating an exemplary process 1700 for carrying out the algorithm described above in relation to FIG. 16. In various examples, the process 1700 may be implemented by an IoE device such as the devices 104a-104j illustrated in FIG. 1; a wireless communication device 200 as illustrated in FIG. 2; one or more processors such as the processor 204 illustrated in FIG. 2; or any other suitable apparatus or means for carrying out the described functions.

At block 1702, while a full-power receiver 210 remains in a sleep state, the wireless communication device 200 may turn on or wake a low-power receiver 211 for a sync period to listen for a sync signal from a wireless network. Here, the duration of the sync period during which the low-power receiver listens for the sync signal may be at least as long as one period of a periodic sync signal.

At block 1704, the wireless communication device 200 may receive the sync signal with the low-power receiver 211, and establish synchronism with the wireless network in accordance with the sync signal. Once synchronism is established, at block 1706, the wireless communication device may again turn on the low-power receiver 211 for a paging occasion, so that the low-power receiver 211, having the capability to receive page information, may receive a page message or a page indicator message. At block 1708, the wireless communication device 200 may determine whether a page message for the wireless communication device 200 has been received. If not, then the device may return to the sleep state. However, if a page message has been received, then at block 1710, the wireless communication device 200 may turn on the full-power receiver 210 and receive a downlink transmission, such as a page message in the case that the low-power receiver 211 received a page indicator. In the case that the low-power receiver 211 received the page message, here, the full-power receiver 210 may receive downlink data transmitted on a traffic channel. Here, a suitable ramp-up time may precede the turning on of the full-power receiver 210. After receiving the downlink transmission, the wireless communication device 200 may return to its sleep state.

In the discussion above, it has been assumed that the wireless communication device 200 is on the receiving side of a sync signal transmitted from some other network device, such as a base station 102 or other suitable P2P node or mesh node. In the case where the transmitting device is a base station 102, and in many cases where a mesh node 104h has grid power, then the power consumption of that device transmitting the sync signal is generally not a concern. However, in the specific case where the device transmitting the sync signal is a P2P node, or other cases where the device transmitting the sync signal is power sensitive (e.g., battery powered), it may be beneficial to account for the power consumption of the device transmitting the sync signal.

For example, in a mesh or P2P network, especially in certain non-real-time applications each of the devices may only wake up on a very sparse time scale, e.g., once a day in some examples. In this instance, both devices may have timing drift issues. Further, when such devices do wake, at least one of them will need to transmit a sync signal, and the other will need to receive that signal. Substantial time may be spent looking for other nodes, evaluating how close those nodes are, how good the channel is, etc., to establish a routing table. These operations may potentially be very power hungry. In accordance some aspects of the disclosure, the low-power transceiver 211 may be utilized to implement this searching or discovery in a mesh or P2P network as described further below.

Figure 18:
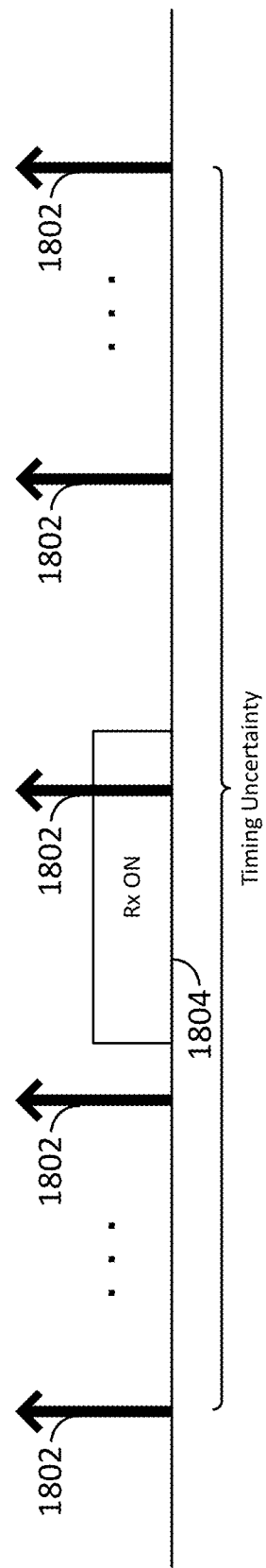
FIG. 18 is a timing diagram illustrating a synchronization procedure between a pair of peer-to-peer nodes where a receiving node utilizes a full-power receiver.

In one example, illustrated in FIG. 18, assume that two P2P nodes, which may be referred to as a transmitting node and a receiving node, are scheduled to communicate with each other once a day. For the sake of example, it may be assumed that the crystal oscillator in each node is such that the maximum drift for each node may be around 8 seconds. Since the drift can potentially go in either direction, the worst case timing uncertainty between the two nodes would be four times this, or around 22 seconds. To limit the duration of the on-time for the receiving node, typically, the transmitting node may schedule the transmission of a discovery or sync signal around the vicinity of the time scheduled for communication, at such a time as to cover the duration of the maximum timing uncertainty.

At the transmitting node, a given amount of power may be consumed for the transmission of a sync signal 1802. Assume that this power may be represented by $P_{tx}$. The total energy consumed for a sync signal transmission having a duration of T is $P_{tx} \times T$. Here, if the transmitting node were to transmit one sync signal 1802 each second for the entire 32 seconds of the timing uncertainty period, then there would be up to 32 sync signal transmission occurrences, consuming an amount of energy equal to $32 \times P_{tx} \times T$.

In this case, with one sync signal 1802 being transmitted every second, the receiving node would suffice to have a single sync period 1804, where its receiver is powered on and listening for the sync signal 1802, to have a duration of one second. The total energy consumed by the receiving node for the sync procedure then would be $P_{rx} \times 1$ second.

Figure 19:
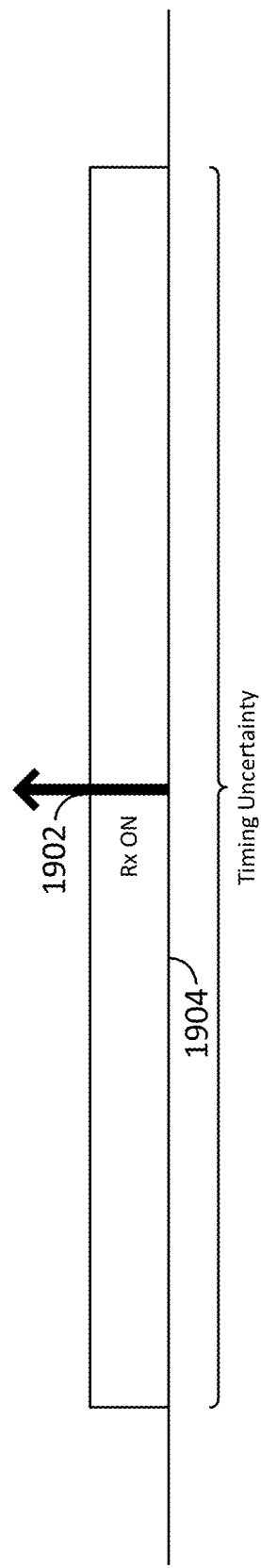
FIG. 19 is a timing diagram illustrating a synchronization procedure between a pair of peer-to-peer nodes where a receiving node utilizes a low-power receiver according to some embodiments.

According to an aspect of the present disclosure, by utilizing the low-power receiver 211 at the receiving node and accordingly modifying the synchronization procedure, this power consumption may be reduced for both the transmitting node and the receiving node. FIG. 19 illustrates a P2P sync procedure according to one example within the scope of the present disclosure.

As in the previous example, assume that a transmitting node and a receiving node are scheduled to communicate with one another once a day. Here, to reduce the power consumption at the transmitting node, the transmitting node may be configured only to transmit the sync signal once, e.g., at the expected time that the receiving node might be awaiting the sync signal. That is, in an aspect of the disclosure, to reduce power consumption at the transmitting node, the number of transmitted sync signals may be reduced, in some examples, down to a single sync signal transmission. As described in further detail below, the timing uncertainty may be accounted for at the receiving node, by extending the duration of the reception period with the low-power receiver 211.

At the transmitting node, assuming the same parameters as the previous example, the power consumed for the transmission of a sync signal may be represented by $P_{tx}$, and the total energy for each sync signal transmission having a duration of T is $P_{tx} \times T$. At the receiving node, however, by virtue of utilizing the low-power companion receiver 211, described above, the power consumed by the receiving node for the sync procedure may be much less than $P_{rx}$. For reference, the power consumed by the receiving node for the sync procedure utilizing the low-power receiver 211 may be represented by $P_{lprx}$, where $P_{lprx} < P_{rx}$. As one example to illustrate the concepts disclosed herein, it may be assumed that $P_{rx} = 100 \times P_{lprx}$. Accordingly, relative to the example described above and illustrated in FIG. 18, a substantially longer on time for the low-power receiver 211 may be utilized while still utilizing less energy than that in the previous example utilizing the full-power receiver 210. According to an aspect of the present disclosure, with the same timing uncertainty for the transmitting and receiving nodes of 8 seconds, and the same worst cast timing uncertainty between the two of 32 seconds, the receiving node may simply turn on its low-power receiver 211, having a sync period 1904 lasting for the entire 32 seconds (i.e., the duration of the worst case timing uncertainty between the transmitting and receiving nodes) while the transmitting node need only transmit a single sync signal 1902. That is, the on time of the low-power receiver 211 may span a duration of a predicted worst case timing drift between the wireless communication device and a peer node in a peer to peer network. In this way, power savings at both the transmitting node and the receiving node may be achieved relative to the case in FIG. 18 utilizing the full-power receiver 210 at the receiving node.

Specifically, utilizing the exemplary figures above, by virtue of utilizing the low-power receiver 211 at the receiving node, the total energy consumption at the receiving node may be reduced from $P_{rx} \times 1$ second, to $P_{lprx} \times 32$ seconds. Because $P_{rx} = 100 \times P_{lprx}$ in this example, this is an energy savings of approximately a factor of 3. Similarly, at the transmitting node, the total energy consumption may be reduced from $32 \times P_{tx} \times T$, to $P_{tx} \times T$, achieving an energy savings of a factor of 32. Of course, these savings may vary in a particular implementation according to the actual difference in power between the full-power receiver 210 and the low-power receiver 211, and the worst case timing uncertainty between a particular transmitting node and receiving node.

As those skilled in the art will readily appreciate, various aspects described throughout this disclosure may be extended to any suitable telecommunication systems, network architectures and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1 and/or 2 may be configured to perform one or more of the methods, features, or steps described herein and illustrated in FIGS. 5-19. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication operable at a wireless communication device, comprising:
    while a first receiver is in a sleep state:
    if a timing drift is not predicted to be below a predetermined threshold:
    waking a second receiver for a synchronization period to listen for a synchronization signal from a wireless network, wherein the second receiver is configured to utilize less power to receive than the first receiver;
    receiving the synchronization signal with the second receiver; establishing synchronism with the wireless network in accordance with the synchronization signal; and
    waking the first receiver from the sleep state to communicate with the wireless network;
    if the timing drift is predicted to be below the predetermined threshold:
    waking the first receiver to listen for the synchronization signal:
    receiving the synchronization signal with the first receiver: and
    establishing synchronism with the wireless network in accordance with the synchronization signal.

2. The method of claim 1, wherein the synchronization signal is of a waveform the first receiver is configured to be capable of receiving and demodulating.

3. The method of claim 2, further comprising:
    determining whether to utilize the second receiver for receiving the synchronization signal further in accordance with network conditions.

4. The method of claim 1, wherein the synchronization signal comprises a first synchronization signal and a second synchronization signal, wherein the first synchronization signal is of a first waveform the first receiver is configured to be capable of receiving and demodulating, wherein the second synchronization signal is of a second waveform dedicated for the second receiver, of a type different than the first waveform.

5. The method of claim 4, wherein the second receiver is a super-regenerative receiver.

6. The method of claim 4, wherein the first receiver is configured for operation in a first radio access technology (RAT), and wherein the second receiver is configured for operation in a second RAT different than the first RAT.

7. The method of claim 4, further comprising:
receiving the first synchronization signal and the second synchronization signal from a same base station.

8. The method of claim 1, wherein the waking of the second receiver further comprises waking the second receiver at a time corresponding to a predicted timing of the synchronization signal, and a timing uncertainty of the predicted timing.

9. The method of claim 1, wherein the synchronization signal is periodic having a synchronization signal period, and wherein the synchronization period has a duration at least as long as one synchronization signal period.

10. The method of claim 1, further comprising:
receiving downlink data utilizing the first receiver; and
returning the first receiver to the sleep state.

11. The method of claim 10, further comprising:
utilizing the second receiver to monitor for a paging signal from the wireless network; and
utilizing the second receiver to receive the paging signal.

12. The method of claim 11, wherein the paging signal comprises a page indicator, and wherein the downlink data comprises a full page message.

13. The method of claim 12, wherein the downlink data further comprises information on a traffic channel.

14. The method of claim 1, wherein the synchronization period is configured to span a duration of a predicted worst case timing drift between the wireless communication device and a peer node in a peer to peer network.

15. The method of claim 1, further comprising:
transmitting a capability message to the wireless network for indicating a capability of the second receiver for communication with the wireless network.

16. The method of claim 15, wherein the capability message is configured to indicate at least one of
one or more waveforms the second receiver is capable of receiving and decoding; or
a capability of the second receiver to receive and detect page messages.

17. The method of claim 15, further comprising:
receiving the synchronization signal configured in accordance with the capability message.

18. The method of claim 1, wherein the waking of the second receiver comprises waking the second receiver a plurality of times according to a first schedule unrelated to a second schedule for the waking of the first receiver from the sleep state to communicate with the wireless network.

19. A wireless communication device, comprising:
means for communicating with a wireless network utilizing a first receiver;
means for determining whether timing drift is predicted to be below a predetermined threshold;
means for receiving a synchronization signal from a wireless network when the timing drift is not predicted to be below the predetermined threshold, wherein the means for receiving the synchronization signal is configured to utilize less power to receive than the means for communicating with the wireless network;
while the means for communicating with the wireless network is in a sleep state, means for waking the means for receiving the synchronization signal for a synchronization period to listen for the synchronization signal when the timing drift is not predicted to be below the predetermined threshold;
means for establishing synchronism with the wireless network in accordance with the synchronization signal when the timing drift is not predicted to be below the predetermined threshold;
means for waking the means for communicating with the wireless network from the sleep state to communicate with the wireless network when the timing drift is not predicted to be below the predetermined threshold;
means for waking the means for communicating with the wireless network to listen for the synchronization signal when the timing drift is predicted to be below the predetermined threshold;
means for receiving the synchronization signal with the means for communicating with the wireless network when the timing drift is predicted to be below the predetermined threshold; and
means for establishing synchronism with the wireless network in accordance with the synchronization signal when the timing drift is predicted to be below the predetermined threshold.

20. A non-transitory computer-readable medium storing computer executable code, comprising instructions for causing a processor to:
while a first receiver is in a sleep state:
if a timing drift is not predicted to be below a predetermined threshold:
wake a second receiver for a synchronization period to listen for a synchronization signal from a wireless network, wherein the second receiver is configured to utilize less power to receive than the first receiver;
receive the synchronization signal with the second receiver;
establish synchronism with the wireless network in accordance with the synchronization signal; and
wake the first receiver from the sleep state to communicate with the wireless network;
if the timing drift is predicted to be below the predetermined threshold:
wake the first receiver to listen for the synchronization signal;
receive the synchronization signal with the first receiver; and
establish synchronism with the wireless network in accordance with the synchronization signal.

21. A wireless communication device, comprising:
a memory;
a first receiver;
a second receiver, wherein the second receiver is configured to utilize less power to receive than the first receiver; and
at least one processor communicatively coupled to the memory, the first receiver, and the second receiver, wherein the at least one processor and the memory are configured to:
while the first receiver is in a sleep state:
if a timing drift is not predicted to be below a predetermined threshold:
wake the second receiver for a synchronization period to listen for the synchronization signal from the wireless network;
receive the synchronization signal with the second receiver;
establish synchronism with the wireless network in accordance with the synchronization signal; and wake the first receiver from the sleep state to communicate with the wireless network;

if the timing drift is predicted to be below the predetermined threshold:

wake the first receiver to listen for the synchronization signal;

receive the synchronization signal with the first receiver; and establish synchronism with the wireless network in accordance with the synchronization signal.

22. The wireless communication device of claim 21, wherein the synchronization signal is of a waveform the first receiver is configured to be capable of receiving and demodulating, and wherein the at least one processor and the memory are further configured to:

determine whether to utilize the second receiver for receiving the synchronization signal further in accordance with network conditions.

23. The wireless communication device of claim 21, wherein the second receiver is a super-regenerative receiver.

24. The wireless communication device of claim 21, wherein the second receiver is further configured for monitoring for and receiving a paging signal from the wireless network.

25. The wireless communication device of claim 24, wherein the paging signal comprises a page indicator, and wherein the first receiver is configured to receive a full page message indicated in the page indicator.

26. The wireless communication device of claim 21, wherein the synchronization period is configured to span a duration of a predicted worst case timing drift between the wireless communication device and a peer node in a peer to peer network.

27. The wireless communication device of claim 21, wherein the at least one processor and the memory are further configured to transmit a capability message to the wireless network for indicating a capability of the second receiver for communication with the wireless network.

28. The wireless communication device of claim 27, wherein the capability message is configured to indicate at least one of one or more waveforms the second receiver is capable of receiving and decoding; or a capability of the second receiver to receive and detect page messages.

29. The wireless communication device of claim 27, wherein the at least one processor and the memory are further configured to receive the synchronization signal configured in accordance with the capability message.

30. The wireless communication device of claim 21, wherein the at least one processor and the memory, being configured to wake the second receiver, are further configured to wake the second receiver a plurality of times according to a first schedule unrelated to a second schedule for the waking of the first receiver from the sleep state to communicate with the wireless network.

* * * * *